US009669899B2

(12) United States Patent
Barefoot et al.

(10) Patent No.: US 9,669,899 B2
(45) Date of Patent: Jun. 6, 2017

(54) ALTERNATING TOOTH CHAIN RING

(71) Applicant: Eko Sport, Inc., Grand Junction, CO (US)

(72) Inventors: Darek C. Barefoot, Grand Junction, CO (US); Scott S. Winans, Grand Junction, CO (US); Timothy A. Fry, Grand Junction, CO (US)

(73) Assignee: EKO Sport, Inc., Grand Junction, CO (US)

( * ) Notice: Subject to any disclaimer, the term of this patent is extended or adjusted under 35 U.S.C. 154(b) by 139 days.

(21) Appl. No.: 14/633,198

(22) Filed: Feb. 27, 2015

(65) Prior Publication Data

US 2015/0239528 A1 Aug. 27, 2015

Related U.S. Application Data

(60) Provisional application No. 61/945,408, filed on Feb. 27, 2014, provisional application No. 62/039,100, filed on Aug. 19, 2014.

(51) Int. Cl.
  *F16H 7/06* (2006.01)
  *F16H 55/30* (2006.01)
  *B62M 9/00* (2006.01)

(52) U.S. Cl.
  CPC .............. *B62M 9/00* (2013.01); *F16H 55/30* (2013.01); *B62M 2700/003* (2013.01)

(58) Field of Classification Search
  CPC ....... B62M 9/10; B62M 9/105; F16H 55/303; F16H 7/06
  USPC ........................................ 474/152, 156, 164
  See application file for complete search history.

(56) References Cited

U.S. PATENT DOCUMENTS

| | | | |
|---|---|---|---|
| 257,445 A | 5/1882 | Lechner | |
| 495,584 A | 4/1893 | Guthrie | |
| 536,813 A | 4/1895 | MacPhail et al. | |
| 586,991 A | 7/1897 | Curley | |
| 590,649 A | 9/1897 | Ribyn, Jr. | |
| 591,270 A | 10/1897 | Gauthier | |
| 619,537 A * | 2/1899 | Bufford | F16H 55/30 |
| | | | 474/156 |
| 1,482,896 A | 2/1924 | Huntington et al. | |
| 1,583,221 A | 5/1926 | Carlson | |
| 1,835,406 A | 12/1931 | Kirsten | |
| 2,602,343 A | 7/1952 | Barrett et al. | |

(Continued)

FOREIGN PATENT DOCUMENTS

| | | |
|---|---|---|
| DE | 2816137 | 10/1979 |
| DE | 102013009492 | 12/2014 |

(Continued)

OTHER PUBLICATIONS

Request for Ex Parte Reexamination of U.S. Pat. No. 9,182,027; Title: Chainring; Applicant: Markus Reiter et al; dated Mar. 31, 2016; Reexam Control No. 90/013,715; 29 pgs.

*Primary Examiner* — Henry Liu
(74) *Attorney, Agent, or Firm* — Jason H. Foster; Kremblas & Foster

(57) ABSTRACT

The present disclosure relates to a chain ring having teeth positioned in one of three lateral positions. At least one tooth may be placed in each lateral position. At least half the teeth may be positioned in a middle lateral position. The teeth in the first and third lateral positions may apply opposing lateral forces to a bicycle drive chain.

19 Claims, 15 Drawing Sheets

(56) References Cited

U.S. PATENT DOCUMENTS

| | | | | |
|---|---|---|---|---|
| 3,167,175 A * | 1/1965 | Kools | ............... | B65G 45/14 198/494 |
| 3,498,148 A | 3/1970 | Gerbasi et al. | | |
| 3,956,943 A * | 5/1976 | Yamasaki | ............... | F16H 55/30 474/148 |
| 3,969,947 A * | 7/1976 | Martin | ............... | F16H 55/30 474/152 |
| 4,144,773 A | 3/1979 | Addicks | | |
| 4,174,642 A * | 11/1979 | Martin | ............... | F16H 55/30 474/152 |
| 4,181,033 A * | 1/1980 | Nagano | ............... | B62M 9/10 474/156 |
| 4,201,120 A | 5/1980 | Segawa | | |
| 4,240,303 A | 12/1980 | Mosley | | |
| 4,261,214 A | 4/1981 | Watanabe et al. | | |
| 4,268,259 A * | 5/1981 | Segawa | ............... | F16H 55/30 474/160 |
| 4,330,286 A * | 5/1982 | Nagano | ............... | F16H 55/30 474/152 |
| 4,384,865 A * | 5/1983 | Ueno | ............... | B62M 9/10 474/160 |
| 4,559,028 A | 12/1985 | Reeves, Jr. | | |
| 4,576,587 A | 3/1986 | Nagano | | |
| 4,727,636 A | 3/1988 | Nagano | | |
| 5,066,264 A * | 11/1991 | Romano | ............... | B62M 9/10 474/152 |
| 5,192,250 A | 3/1993 | Kobayaski | | |
| 5,285,701 A | 2/1994 | Parachinni | | |
| 5,503,598 A * | 4/1996 | Neuer | ............... | B62M 9/10 474/160 |
| 5,545,096 A * | 8/1996 | Su | ............... | B62M 9/10 474/160 |
| 5,935,033 A | 8/1999 | Tseng et al. | | |
| 6,013,001 A | 1/2000 | Miyoshi | | |
| 6,203,462 B1 | 3/2001 | Takamori | | |
| 6,325,734 B1 * | 12/2001 | Young | ............... | F16H 7/06 474/156 |
| 6,500,084 B2 | 12/2002 | Wigsten | ............... | F16H 55/30 474/152 |
| 6,761,657 B2 * | 7/2004 | Young | ............... | F16H 7/06 474/152 |
| 7,416,500 B2 * | 8/2008 | Young | ............... | F16H 7/06 474/152 |
| 7,462,120 B1 | 12/2008 | Thompson | ............... | B62M 9/105 474/152 |
| 7,491,143 B2 * | 2/2009 | Valle | ............... | B62M 9/105 474/152 |
| 7,686,721 B2 * | 3/2010 | Tabe | ............... | B62M 9/105 474/116 |
| 7,824,287 B2 * | 11/2010 | Nonoshita | ............... | B62M 9/10 474/152 |
| D715,699 S * | 10/2014 | Reiter | ............... | B62M 9/105 D12/123 |
| D716,191 S * | 10/2014 | Reiter | ............... | F16H 55/303 D12/123 |
| 8,882,619 B2 * | 11/2014 | Braedt | ............... | B62M 9/10 474/156 |
| 8,888,631 B2 * | 11/2014 | Morita | ............... | F16H 7/06 474/153 |
| 9,062,758 B2 * | 6/2015 | Reiter | ............... | F16H 55/303 |
| 9,086,138 B1 * | 7/2015 | Emura | ............... | B62M 9/105 |
| 9,182,027 B2 * | 11/2015 | Reiter | ............... | B62M 9/105 |
| 9,291,250 B2 * | 3/2016 | Reiter | ............... | B62M 9/105 |
| 9,334,014 B2 * | 5/2016 | Fukunaga | ............... | B62M 9/10 |
| 9,394,986 B2 * | 7/2016 | Pfeiffer | ............... | B62M 9/105 |
| 9,394,987 B2 * | 7/2016 | Pfeiffer | ............... | B62M 9/105 |
| 9,404,565 B2 * | 8/2016 | Pfeiffer | ............... | F16H 55/30 |
| 9,440,706 B2 * | 9/2016 | Iwai | ............... | B62M 9/105 |
| 9,457,870 B2 * | 10/2016 | Sugimoto | ............... | B62M 9/105 |
| 9,463,844 B2 * | 10/2016 | Fukunaga | ............... | B62M 9/10 |
| 9,493,211 B2 * | 11/2016 | Reiter | ............... | B62M 9/105 |
| 2002/0098934 A1 | 7/2002 | Wigsten | ............... | F16H 55/30 474/212 |
| 2005/0090349 A1 * | 4/2005 | Lee | ............... | B62M 9/105 474/160 |
| 2006/0172840 A1 * | 8/2006 | Kamada | ............... | B62M 9/10 474/152 |
| 2006/0258498 A1 * | 11/2006 | Tabe | ............... | B62M 9/105 474/160 |
| 2007/0054768 A1 * | 3/2007 | Miyazawa | ............... | F16H 55/30 474/152 |
| 2011/0092327 A1 * | 4/2011 | Oishi | ............... | B62M 9/10 474/160 |
| 2012/0172165 A1 * | 7/2012 | Schroedl | ............... | B62M 9/02 474/160 |
| 2013/0072334 A1 * | 3/2013 | Braedt | ............... | F16H 7/06 474/156 |
| 2013/0109519 A1 * | 5/2013 | Morita | ............... | F16H 55/30 474/148 |
| 2013/0139642 A1 * | 6/2013 | Reiter | ............... | B62M 9/105 74/594.2 |
| 2013/0184110 A1 * | 7/2013 | Reiter | ............... | F16H 55/303 474/152 |
| 2013/0345006 A1 * | 12/2013 | Yang | ............... | F16H 55/30 474/156 |
| 2014/0100069 A1 * | 4/2014 | Reiter | ............... | B62M 9/105 474/156 |
| 2014/0364259 A1 * | 12/2014 | Reiter | ............... | F16H 55/30 474/155 |
| 2015/0198231 A1 * | 7/2015 | Emura | ............... | B62M 9/105 474/156 |
| 2015/0217834 A1 * | 8/2015 | Iwai | ............... | B62M 9/105 474/152 |
| 2015/0226308 A1 * | 8/2015 | Pfeiffer | ............... | B62M 9/105 474/152 |
| 2015/0285362 A1 * | 10/2015 | Pfeiffer | ............... | B62M 9/10 474/152 |
| 2015/0285363 A1 * | 10/2015 | Pfeiffer | ............... | B62M 9/10 474/152 |
| 2016/0053882 A1 * | 2/2016 | Watarai | ............... | B62M 9/10 474/152 |
| 2016/0121966 A1 * | 5/2016 | Reiter | ............... | B62M 9/105 474/148 |
| 2016/0339995 A1 * | 11/2016 | Sugimoto | ............... | B62M 9/105 |
| 2016/0347409 A1 * | 12/2016 | Watarai | ............... | B62M 9/02 |

FOREIGN PATENT DOCUMENTS

| | | |
|---|---|---|
| EP | 2602176 | 6/2013 |
| EP | 2810864 | 12/2014 |
| GB | 1523626 | 9/1978 |
| JP | 56-42489 | 4/1981 |
| JP | S60-104866 | 6/1985 |
| JP | 1-171795 | 12/1989 |
| JP | 2002-243020 | 8/2000 |
| JP | 2000-355295 | 12/2000 |
| JP | 2001-187957 | 7/2001 |
| JP | 2007-71302 | 3/2007 |
| JP | 2007-198403 | 8/2007 |
| WO | 03095867 | 11/2003 |

\* cited by examiner

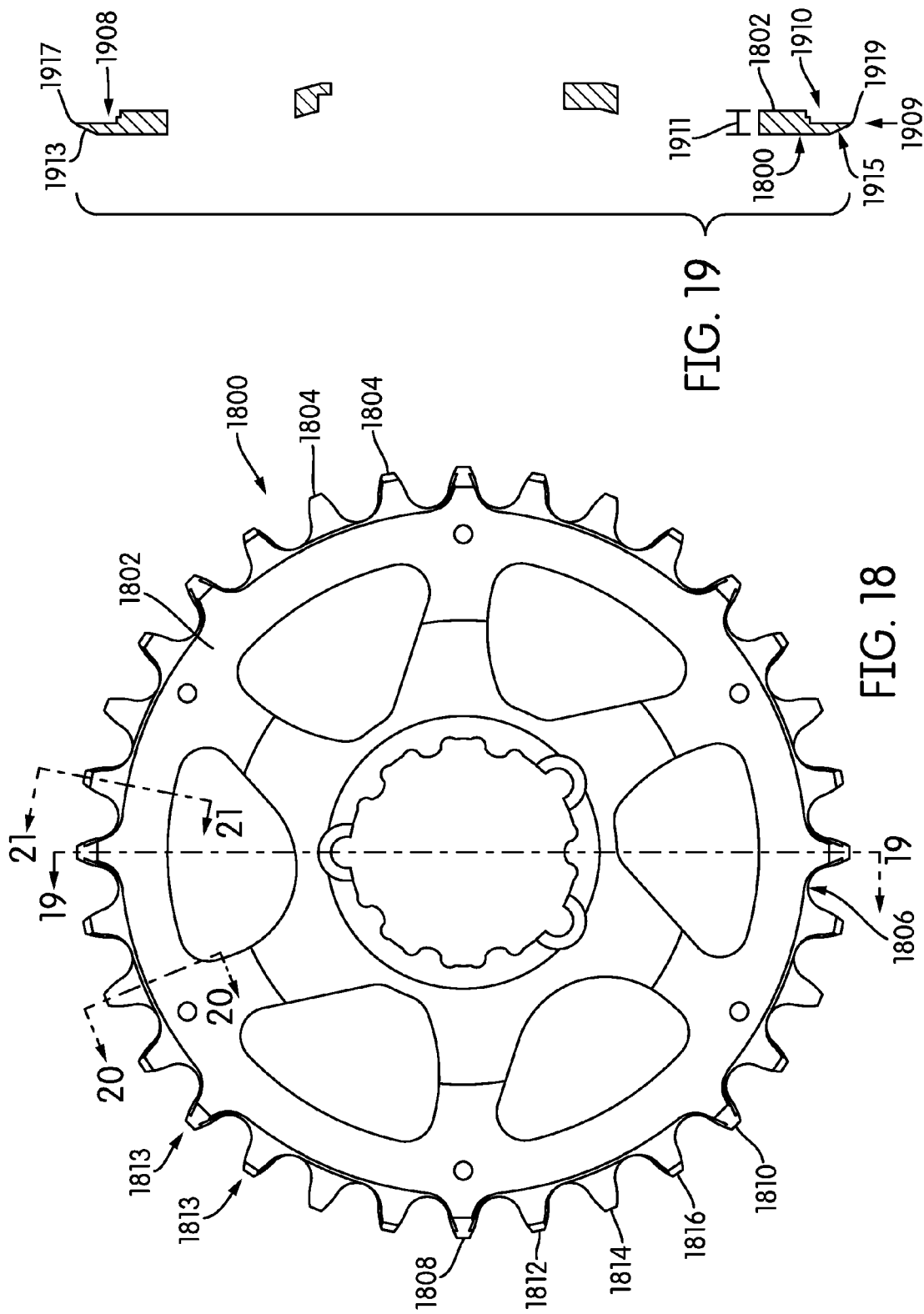

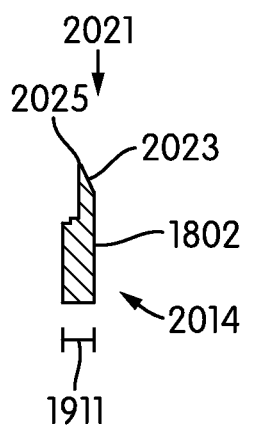
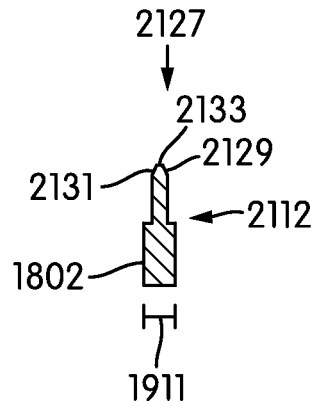
FIG. 20    FIG. 21
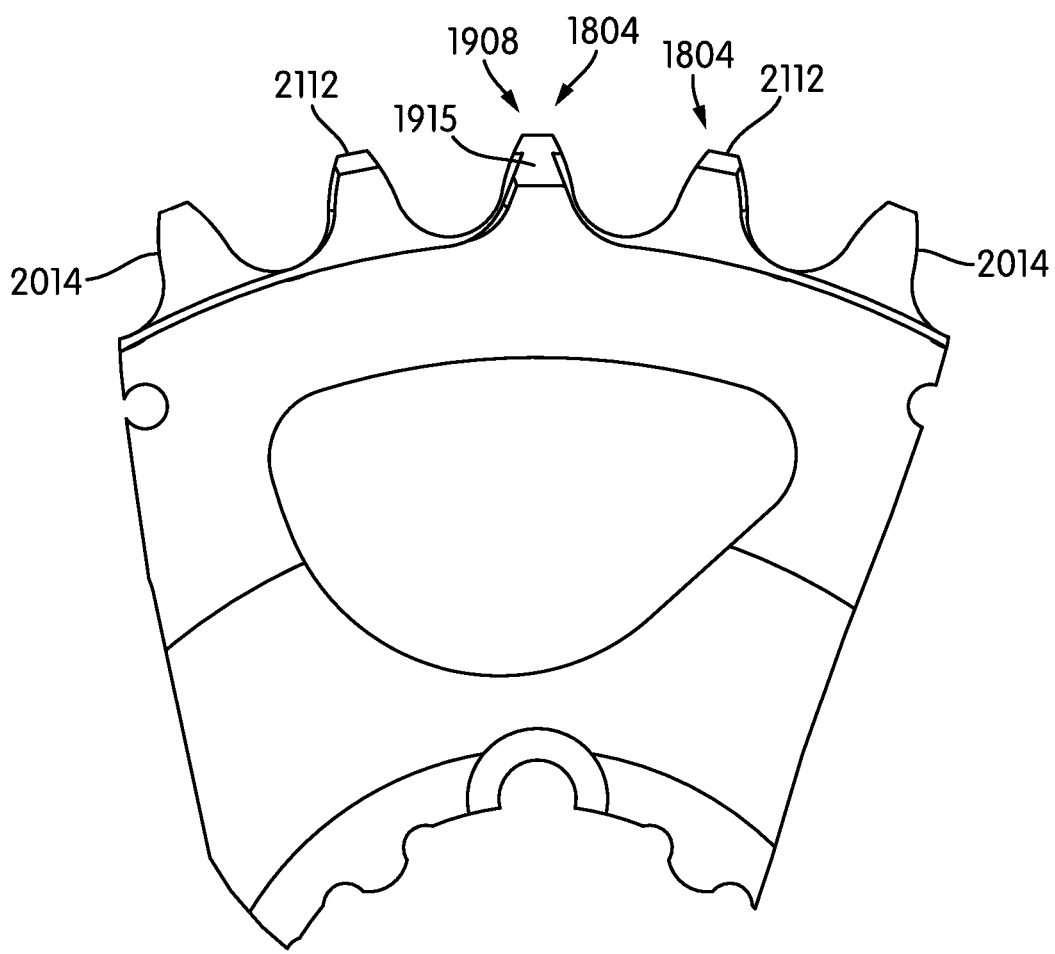
FIG. 22

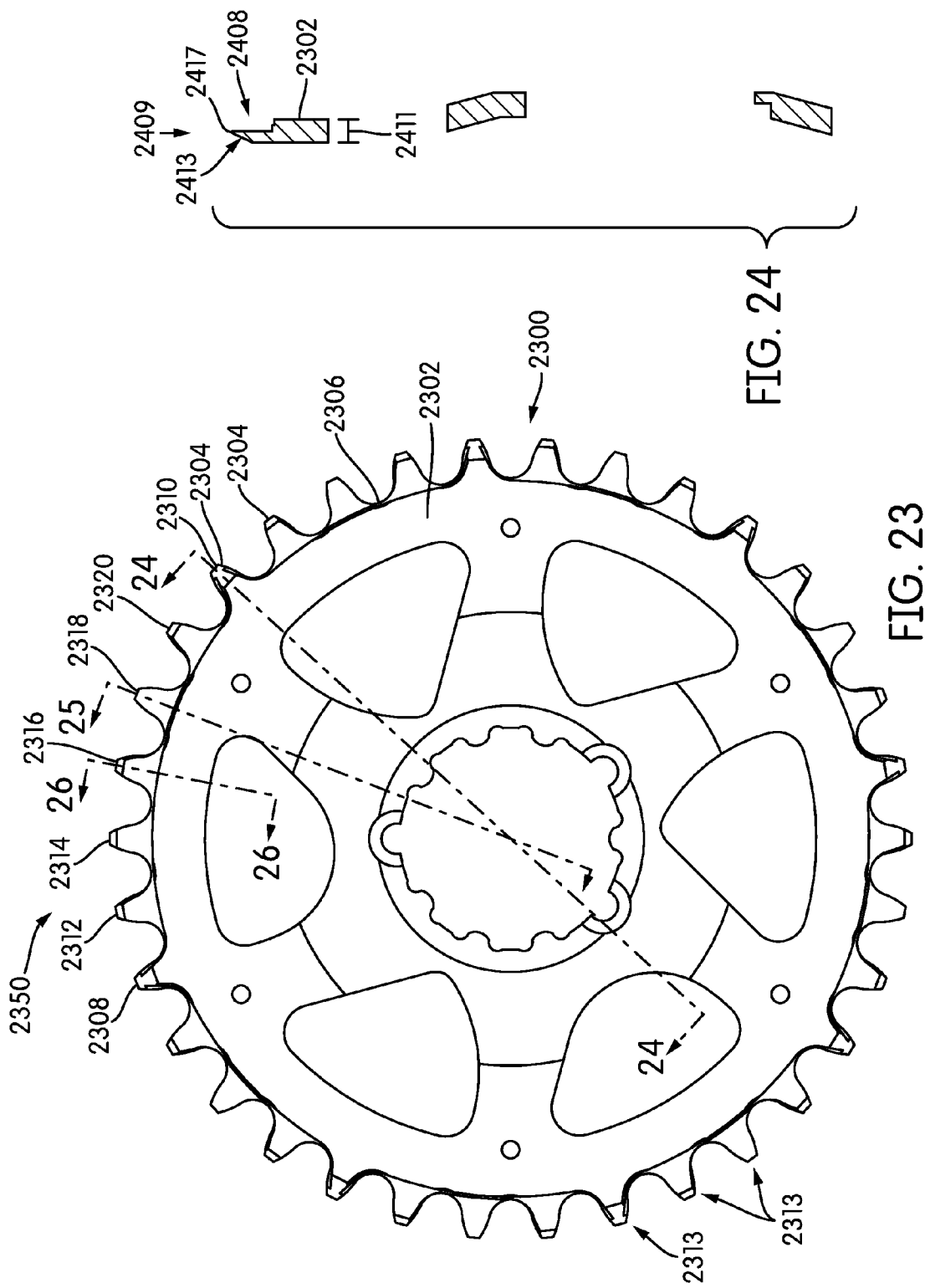

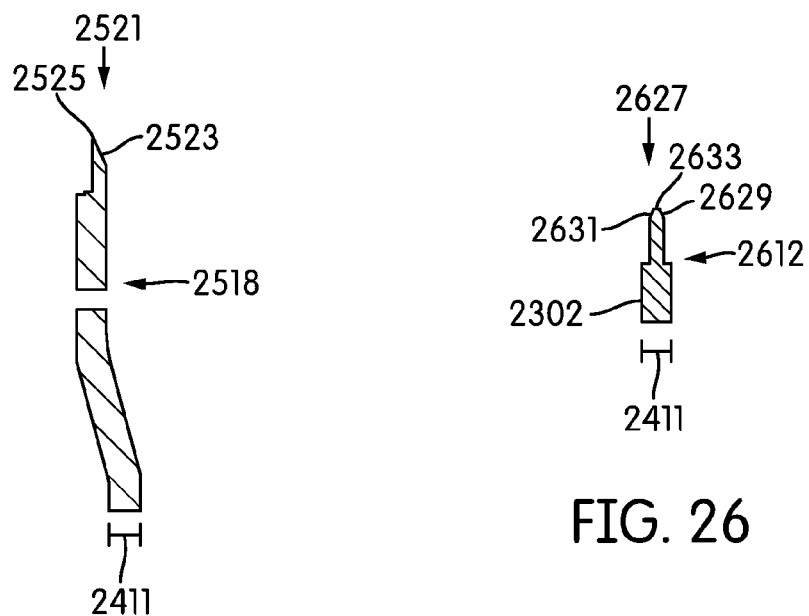
FIG. 25
FIG. 26
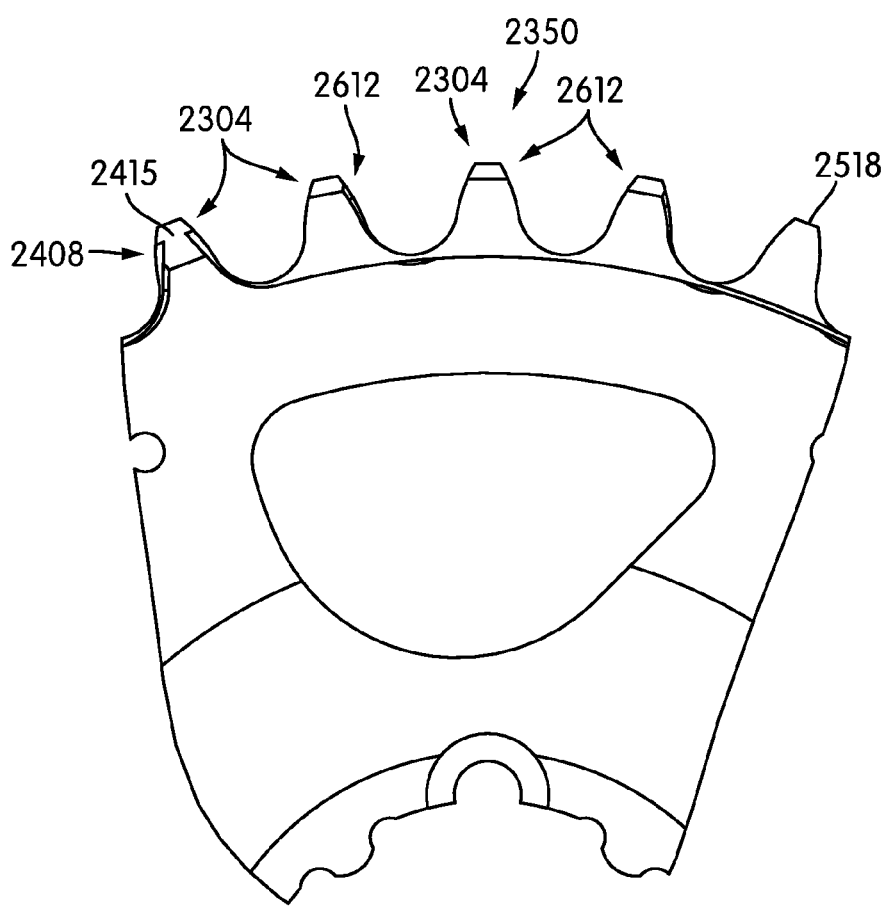
FIG. 27

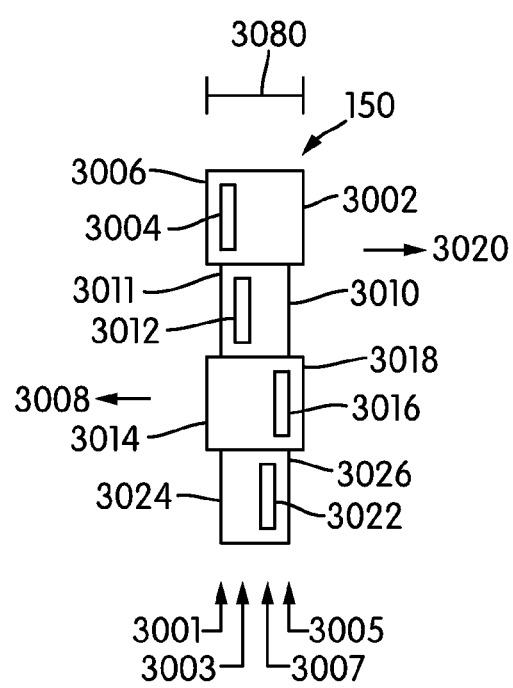
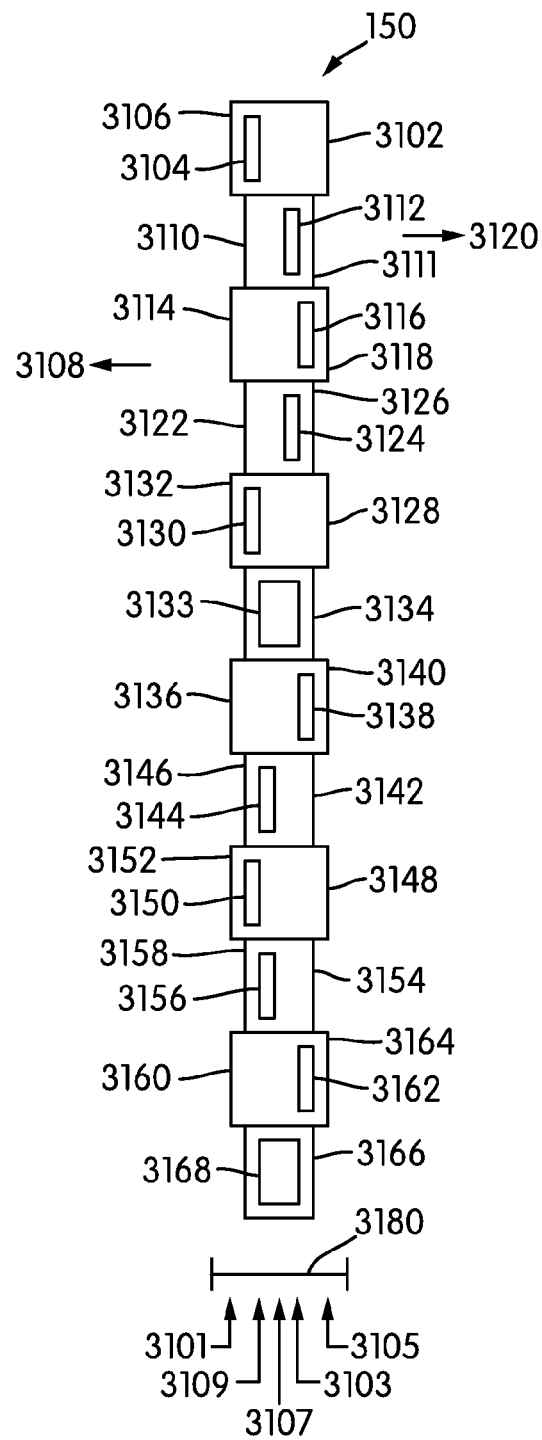
FIG. 30
FIG. 31

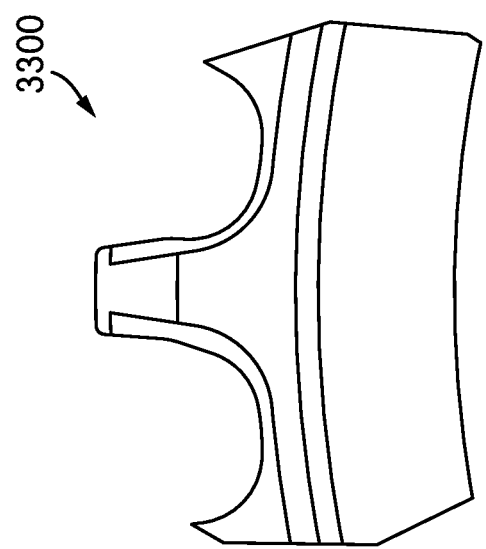
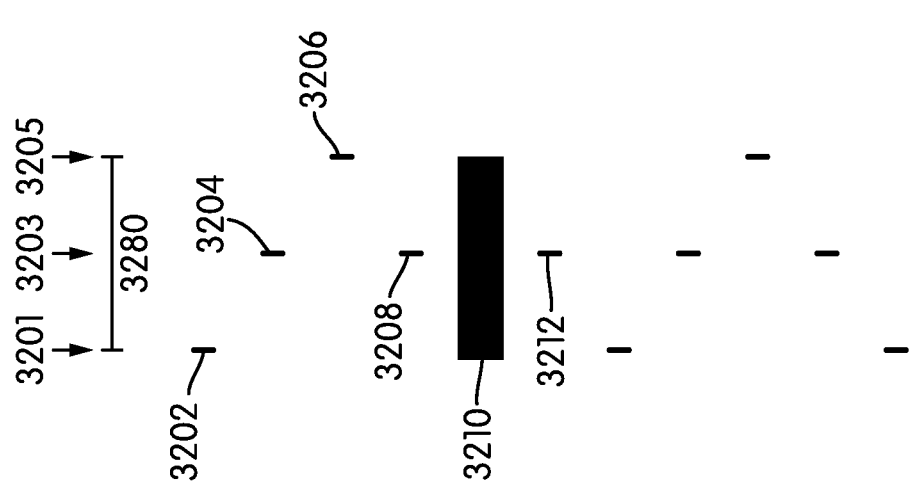

ALTERNATING TOOTH CHAIN RING

CROSS-REFERENCES TO RELATED APPLICATIONS

This application claims the benefit of U.S. Provisional Application No. 61/945,408 filed Feb. 27, 2014 and U.S. Provisional Application No. 62/039,100 filed Aug. 19, 2014.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates generally to a chain ring for a vehicle. More particularly, the present disclosure relates to a chain ring that has alternating teeth that may form a wave pattern.

Drive chains used for vehicles, like bicycles, are formed of alternating links. A first link has a narrow opening. The flanking second links are wider. As may be seen best in FIG. 1, bicycle drive chains may be made from outer links 100 and inner links 102. In general, the length 104 of each link is about the same. However, the outer links 100 and the inner links 102 differ in width. The outer link 100 may have a width 106 wider than the width 103 of the inner link 102. It will be understood by a person having ordinary skill in the art that in a conventional bicycle drive chain, the series of alternating outer links 100 and inner links 102 alternate for whatever length of drive chain is deemed desirable. The chain as a whole may be referred to as the chain 150.

A conventional chain ring is shown in FIG. 2. The chain ring 210 includes a plurality of teeth 212 of substantially similar size and shape. The use of teeth of substantially similar size and shape may allow for gaps between an outer surface 214 of a tooth 212 and a first inner lateral surface 110 or a second inner lateral surface 112 of an outer link 100 of a drive chain (see FIG. 1). In many conventional applications, these gaps may not drastically hinder performance, but may increase the risk of chain disengagement.

In the past, some manufacturers have attempted to create chains that have alternating teeth. These alternating teeth may be configured to correspond in size and shape more closely to the alternating width of the links in a chain. However, the use of teeth of larger size also may increase the weight of the chain ring and the vehicle, which may be deemed undesirable. In addition, the use of a tooth of larger size may, in some cases, increase the risk of a tooth catching on a portion of the chain due to that increased size, thereby creating damage or risk of injury. Further, the use of such a design may increase the likelihood of dirt, mud, or other debris becoming entangled in the ring and/or between the teeth of the ring and impeding the meshing of the teeth and the chain.

BRIEF SUMMARY OF THE INVENTION

In one embodiment, a chain ring may include a body and a plurality of teeth defining a single ring of teeth that are circumferentially affixed to the body. The body may have a thickness. At least a first one of the plurality of teeth may be positioned at a first position across the thickness. At least a second one of the plurality of teeth may be positioned at a second position across the thickness. At least a third one of the plurality of teeth may be positioned at a third position across the thickness. The first, second, and third positions may differ from one another.

The at least a first one and the at least a third one may be mirror images of one another. Each of the plurality of teeth may have a substantially rectangular end face. The at least a first one and the at least a third one may each have a substantially hat-shaped cross section at their respective bases. The at least a first one and the at least a second one may be placed adjacent one another and the at least a second one and the at least a third one may be placed adjacent one another. The chain ring may further include at least a fourth one of the plurality of teeth. The at least a fourth one may be positioned at the second position across the thickness. The chain ring may further comprise at least one tooth in a fourth position across the thickness. The chain ring may further comprise at least one tooth in a fifth position across the thickness. Each tooth in each position across the thickness may be circumferentially spaced from each other tooth.

In another embodiment, a chain ring may include a plurality of teeth. Each tooth may have an end face having a centerpoint. Centerpoints of at least five adjacent teeth may form a substantially undulating pattern. At least one centerpoint of at least one of the at least five teeth may be positioned away from a peak or valley of the substantially undulating pattern.

Three of the at least five teeth may be positioned away from a peak or valley of the substantially undulating pattern. The substantially undulating pattern may be substantially regular around a circumference of the chain ring. The substantially undulating pattern may be substantially a triangle wave.

In another embodiment, a chain ring includes a plurality of teeth. Each tooth may be positioned in one of a first, second, and third lateral position. At least one tooth may be positioned in the first lateral position. At least one tooth may be positioned in the third lateral position. At least half the teeth may be positioned in the second lateral position.

Exactly half the teeth may be positioned in the second lateral position. The second lateral position may be laterally between the first lateral position and the third lateral position. About a quarter of the teeth may be positioned in the first lateral position and about a quarter of the teeth may be positioned in the third lateral position. The teeth may be positioned in a substantially repeating pattern of lateral positions along a circumference of the chain ring. The teeth may be positioned in a substantially repeating pattern of four teeth. The repeating pattern may be a tooth in the second lateral position, a tooth in the first lateral position, a tooth in the second lateral position, and a tooth in the third lateral position.

In another embodiment, a chain ring may include a plurality of teeth. Each tooth may be positioned at a respective lateral position on a thickness of the chain ring. At least a first tooth and a second tooth of the plurality of teeth may be circumferentially spaced from one another and positioned at a first lateral position. At least three of the plurality of teeth may be circumferentially positioned between the first tooth and the second tooth. Each of the at least three teeth may be positioned at a lateral position different from the first lateral position.

At least two of the at least three teeth may be positioned at a second lateral position. At least one of the at least three teeth may be positioned at a third lateral position. The tooth positioned at the third lateral position may be circumferentially positioned between the at least two teeth positioned at the second lateral position. The at least three teeth may each be positioned at a second lateral position. No tooth in the first lateral position may be positioned between the first tooth and the second tooth.

In another embodiment, the chain ring may include a body and a plurality of teeth affixed around a circumference of the body. The teeth may be configured to engage a chain without shifting. Some of the plurality of teeth may be configured to engage a first lateral side of a first link of the chain, thereby applying a force to the chain in a first lateral direction. Some of the plurality of teeth may be configured to engage a second lateral side of a second link of the chain, thereby applying a force to the chain in a second lateral direction. Some of the plurality of teeth may be configured to apply no substantial lateral force to the chain.

When a lateral force is applied to the chain, the chain may be permitted to flex in that direction. The first lateral force and the second lateral force may be approximately equal. The teeth may be positioned in three lateral positions. The teeth in the first lateral position may be configured to impart a first lateral force. The teeth in the third lateral position may be configured to impart a second lateral force. The teeth in the second lateral position may be configured to impart substantially no lateral force. At least one tooth may be configured to engage a first lateral side of an outer link of the chain. At least one tooth may be configured to engage a first lateral side of an inner link of the chain.

BRIEF DESCRIPTION OF THE SEVERAL VIEWS OF THE DRAWINGS

FIG. 18 is a side view of another alternative embodiment of a chain ring in accordance with the disclosure;

FIG. 19 is a sectional view of the embodiment of FIG. 18 taken along line 19-19;

FIG. 20 is a sectional view of the embodiment of FIG. 18 taken along line 20-20;

FIG. 21 is a sectional view of the embodiment of FIG. 18 taken along line 21-21;

FIG. 22 is a closer view of an arc of the embodiment of FIG. 18;

FIG. 23 is a side view of yet another alternative embodiment of a chain ring in accordance with the disclosure;

FIG. 24 is a sectional view of the embodiment of FIG. 23 taken along line 24-24;

FIG. 25 is a sectional view of the embodiment of FIG. 23 taken along line 25-25;

FIG. 26 is a sectional view of the embodiment of FIG. 23 taken along line 26-26;

FIG. 27 is a closer view of an arc of the embodiment of FIG. 23;

FIG. 30 is a sectional view of the embodiment of FIG. 16 taken along line 17-17 and illustrating a tooth configuration similar to that of FIG. 28;

FIG. 31 is a sectional view of the embodiment of FIG. 16 taken along line 17-17 and illustrating a tooth configuration similar to that of FIG. 29;

FIG. 32 is a schematic view showing another alternative embodiment of the chain ring in accordance with the disclosure; and FIG. 33 is a side view of a tooth showing a profile that may be used in any of the embodiments shown.

Figure 1:
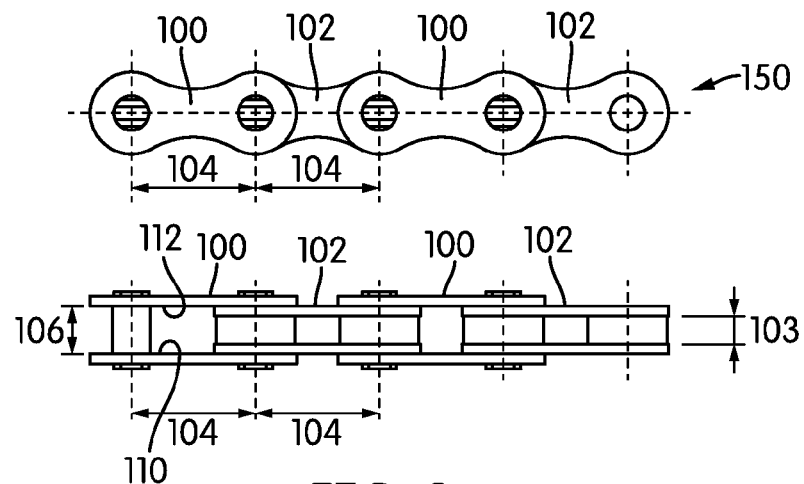
FIG. 1 is a top and side view of a conventional chain.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

The present disclosure incorporates by reference the disclosures of U.S. Provisional Patent Application Ser. No. 61/945,408, filed Feb. 27, 2014 and U.S. Provisional Application No. 62/039,100 filed Aug. 19, 2014.

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

Figure 2:
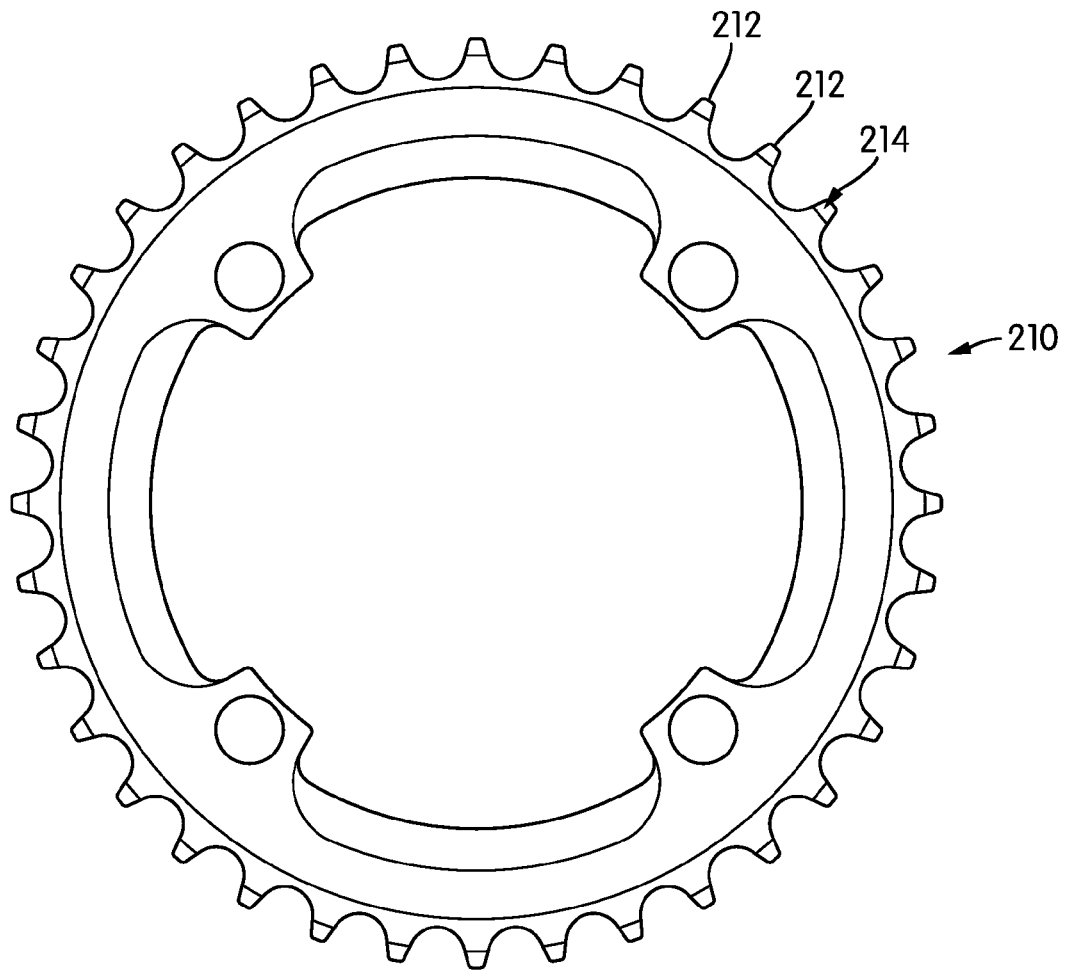
FIG. 2 is a side view of a conventional chain ring.
Figure 5:
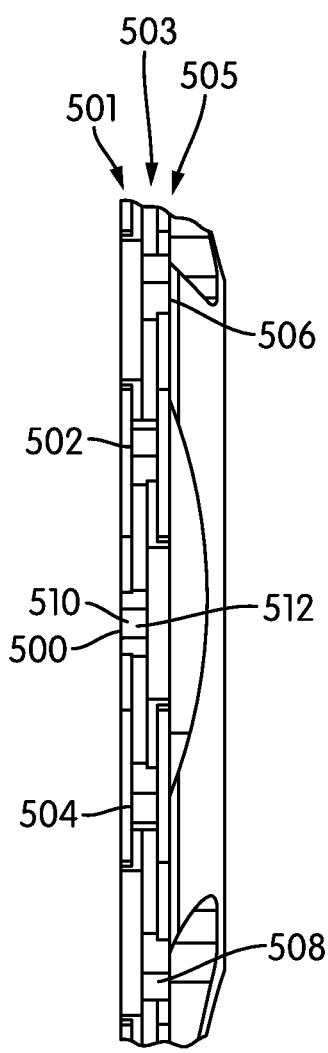
FIG. 5 is a close view, represented by the dashed circle of FIG. 6, of one end of a chain ring in accordance with the embodiment of FIG. 3.
Figure 6:
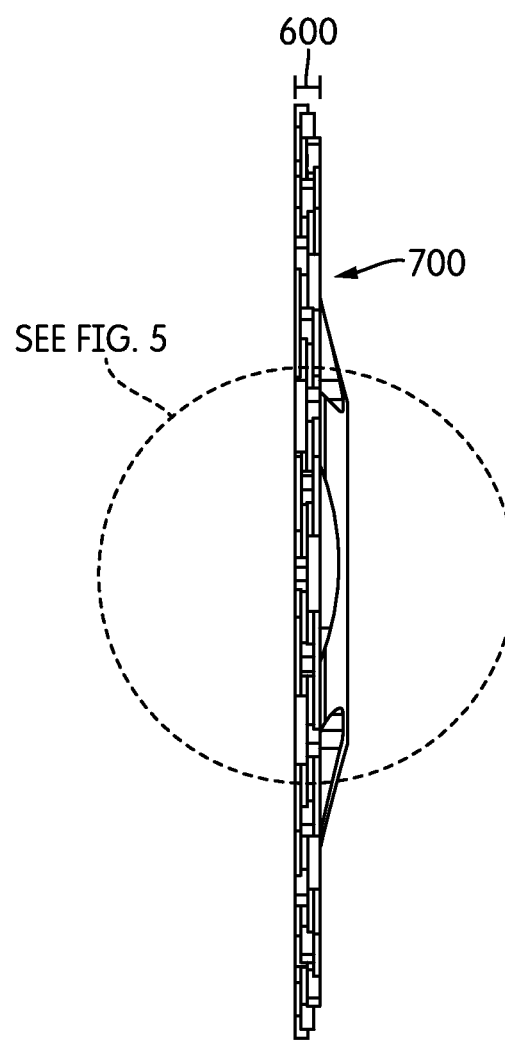
FIG. 6 is an end view of the chain ring, being from further away than the view of FIG. 5.
Figure 7:
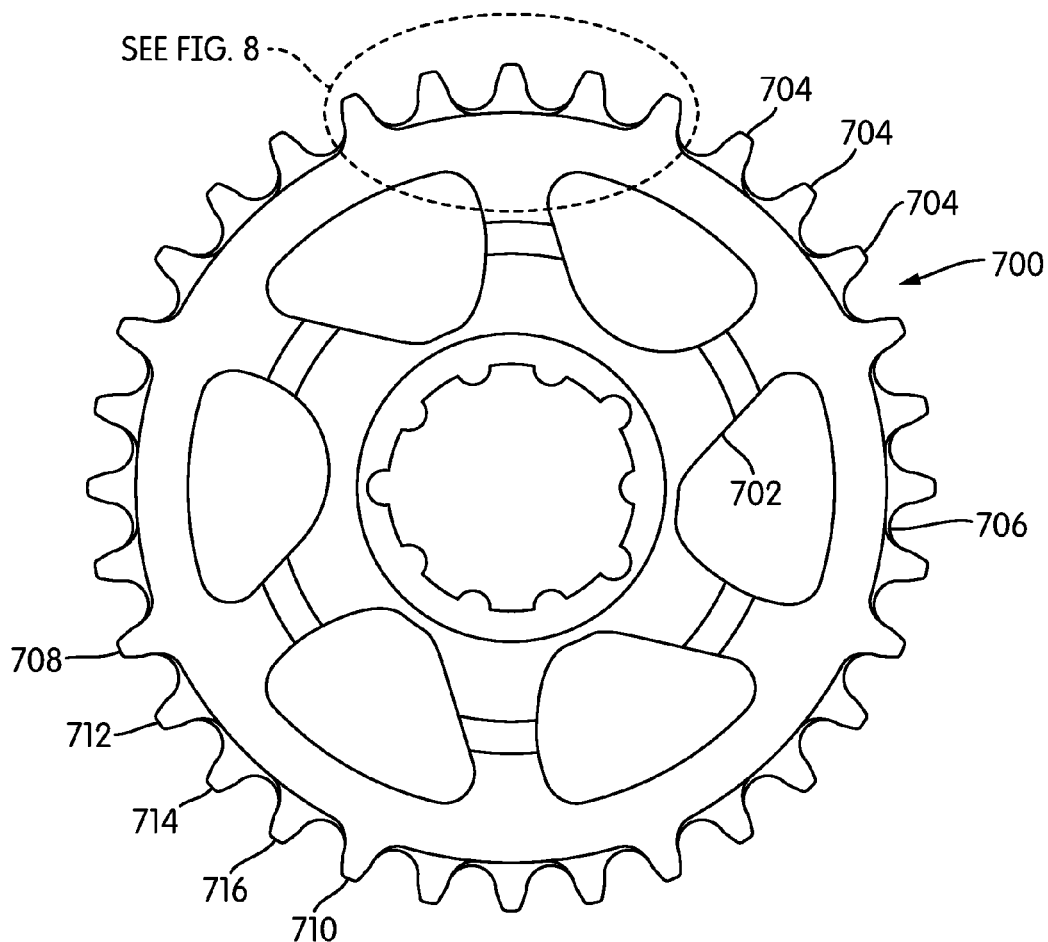
FIG. 7 is side view of the chain ring in accordance with the embodiment of FIG. 3.
Figure 8:
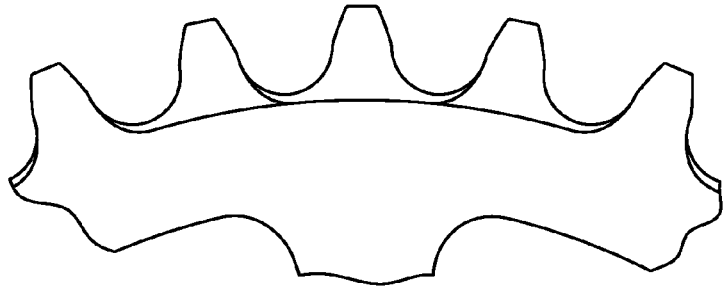
FIG. 8 is an enlarged view of a portion of the chain ring as shown in the dashed circle of FIG. 7.

The overall shape and configuration of one embodiment of the chain ring according to the present disclosure is shown in FIGS. 3-8. Turning first to FIG. 7, the chain ring 700 may include a body 702 and a plurality of teeth 704 circumferentially affixed or affixed around a circumference 706 of the body 702. It is noted that in the embodiment shown in FIGS. 3-8, along with other embodiments illustrated and described, the chain ring 700 is shown as having a "direct mount" style. A person having ordinary skill in the art understands that instead of a direct mount, a traditional mount style similar to that shown as being conventional in FIG. 2 could alternatively be used. Other mounting styles may also be appropriate, depending on the wishes of the designers and users. How the chain ring 700 is to be mounted to the vehicle is not of primary importance in this disclosure.

The teeth 704 in the disclosed embodiments may be discussed in the disclosure as being positioned circumferentially with respect to one another. In particular, some teeth may be described as being circumferentially adjacent one another or circumferentially spaced from one another. As one example, a first tooth 708 may be circumferentially spaced from a second tooth 710. In the embodiment disclosed in FIG. 7, the first tooth 708 and the second tooth 710 may be described as having three teeth, specifically the third tooth 712, the fourth tooth 714, and the fifth tooth 716, circumferentially between the first tooth 708 and the second tooth 710. Similarly, the third tooth 712 may be described as being circumferentially adjacent the first tooth 708 and the fourth tooth 714. When discussing any tooth 704 circumferentially with respect to any other tooth 704, the lateral position, i.e., the position of the tooth 704 along or across a width of the chain ring body 702 is not important. Teeth that are circumferentially adjacent one another may also be considered positioned serially with respect to one another.

It is noted that in each of the illustrated embodiments, each tooth 704 is circumferentially spaced from each other tooth 704. In these embodiments, no two teeth 704 occupy the same or a similar circumferential position. In many embodiments, such a design choice may be made for ease and cost of manufacturing. However, other design choices regarding co-location or other partial or complete overlapping circumferentially of multiple teeth could be made if deemed desirable or necessary by a designer.

Figure 4:
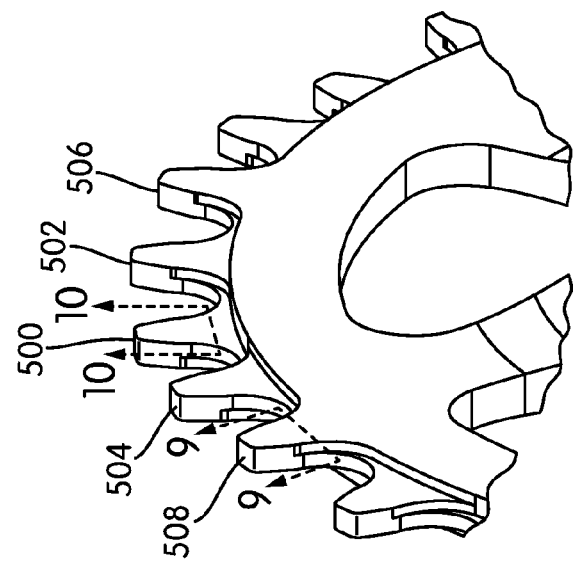
FIG. 4 is an enlarged view of a portion of the chain ring as shown by a dashed circle in FIG. 3.
Figure 3:
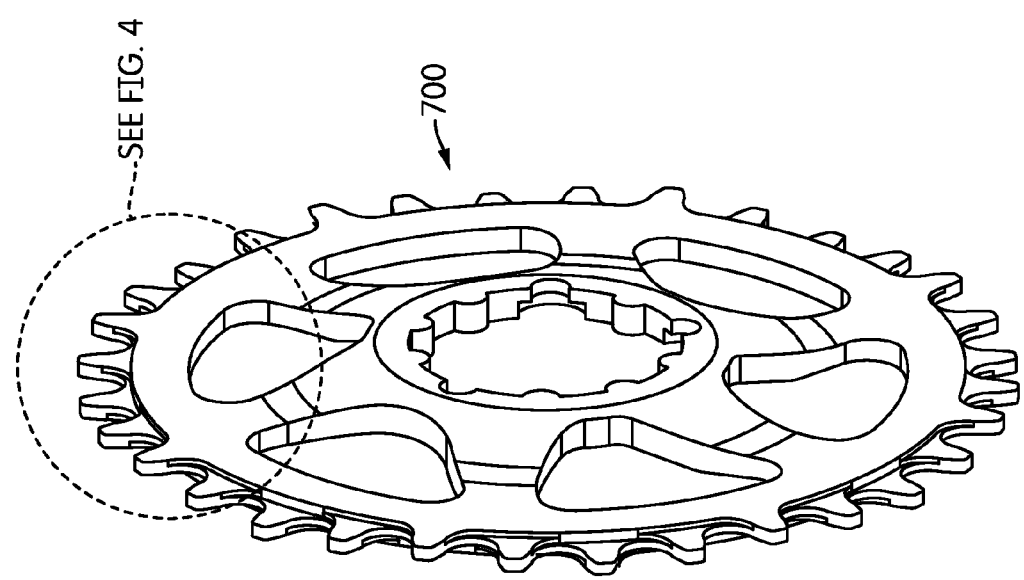
FIG. 3 is a perspective view of an embodiment of a chain ring in accordance with the disclosure.

The lateral position of the teeth across a width or thickness of the chain ring may be best seen in the perspective views of FIGS. 3 and 4 and the side views of FIGS. 5 and 6. As may be seen most clearly in FIG. 6, the chain ring 700 may have a thickness 600. Each tooth 704 may be positioned at a designated or respective lateral position across the thickness 600. As may be seen in FIG. 5, a first tooth 500 may be positioned at a first lateral position 501. Each of a second tooth 502 and a third tooth 504 may be positioned at a second lateral position 503. Each of a fourth tooth 506 and a fifth tooth 508 may be positioned at a third lateral position 505. The first position 501, the second position 503 and the third position 505 may differ from one another. The second position 503 may be between the first position 501 and the third position 505 and may be considered a middle position. Additional details regarding the lateral positions of the teeth will be disclosed below.

In some embodiments, the chain ring 700 may be machined from a single piece of metal or other desirable composite. In some embodiments, the body 702 of the chain ring 700 may be formed by machining, punching, or other suitable method. In some embodiments, the body 702 may be made of more than one piece, and the pieces joined together, for example, by welding or sintering. The body may then be placed on a rotating jig and the sides of the teeth 704 may be tapered by abrading the sides of the teeth to form a taper (not shown in this embodiment) on each side of the chain ring. The teeth shapes may then be machined in any conventional manner.

Figure 9:
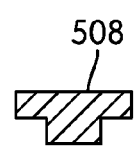
FIG. 9 is a cross-sectional view of a tooth taken along line 9-9 of FIG. 4.
Figure 10:
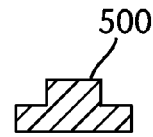
FIG. 10 is a cross-sectional view of another tooth taken along line 10-10 of FIG. 4.

In many embodiments, it may be desirable for the chain ring teeth to be generally laterally symmetrical. For example, in many embodiments, the first tooth 500 and either the fourth tooth 506 or the fifth tooth 508 (or both) may be mirror images of each other. As may be seen in FIGS. 9 and 10, the cross-sectional shape of the first tooth 500 (FIG. 10) and the fifth tooth 508 (FIG. 9) may be generally hat-shaped. In many embodiments, each tooth may have an end face, such as the end face 510 of the first tooth 500 (see FIG. 5). Each end face may be rectangular. Each end face may have a centerpoint, like centerpoint 512 of the end face 510 of the first tooth 500.

Figure 16:
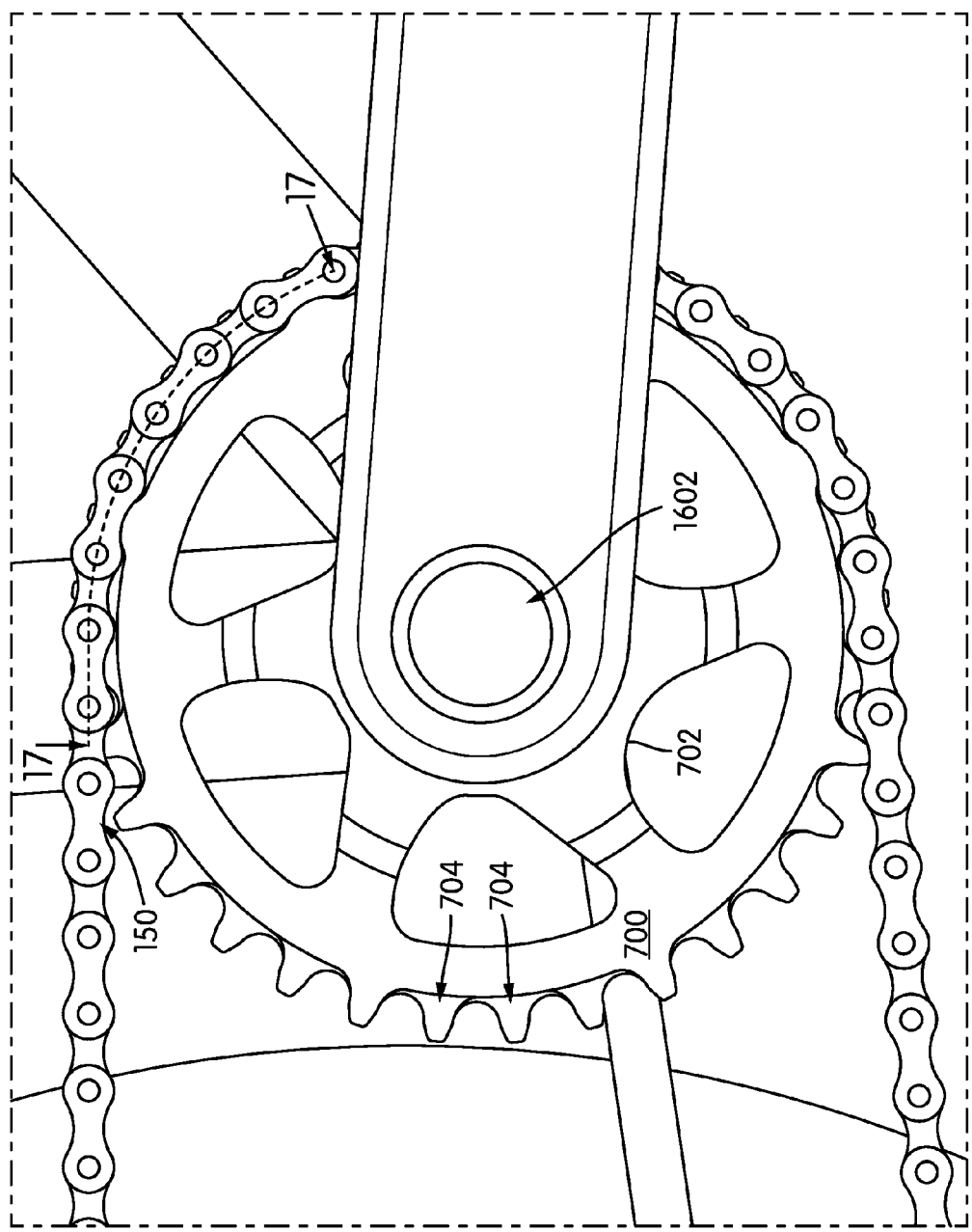
FIG. 16 is a side view of a bicycle showing one embodiment of a chain ring in operative position.

The operation of the device as a whole may be understood more clearly in reference to FIG. 16. In many embodiments, the chain ring 700 may be configured to engage a crank shaft 1602 in a conventional manner. As the user pedals, the crank shaft 1602 turns and rotates the chain ring 700, thereby engaging and driving the chain 150. In one embodiment, the chain ring 700 is a single chain ring. However, in other embodiments, the chain ring 700 may be one of a series of two or more chain rings. The teeth 704 of each chain ring 700 are configured to serially engage the connected links in the chain 150 without the chain shifting between rings or between rows of serially arranged teeth 704. That is, when the chain ring 700 is rotated about its axis, the serially-arranged teeth 704 engage the serially connected links in the chain 150 mounted thereon as long as the chain ring 700 is rotated and the chain 150 remains engaged on the teeth 704. Further details of the operation will be discussed after the discussion of the schematics of the various embodiments.

Turning now to the schematics of FIGS. 11-15, 28, and 29, it may be observed that each schematic shows a series of spaced vertical lines. Each series of spaced vertical lines shows vertical lines in one of at least three lateral positions across a width or thickness of the chain ring. These vertical lines are symbolic representations of the end faces of the teeth of a given chain ring. The lines are shown as being substantially the same shape and size as one another. However, the end faces of the teeth of any given chain ring may differ in size and shape from one another. In addition, the lateral space between the teeth compared to the width of the end face as depicted may be exaggerated and not to scale. A person having ordinary skill in the art will recognize that these schematics are used to demonstrate a general spatial relationship between the end faces of the teeth for illustration, not as a precise, detailed location of each tooth. In addition, a person having ordinary skill in the art will understand that for each pattern illustrated, that pattern may repeat around the circumference of any given chain ring (usually having between 32 and 48 teeth). Alternatively, a chain ring may instead use alternating patterns of those illustrated. A person having ordinary skill in the art will be able to select an appropriate pattern or series of patterns to use in a given chain ring application. Finally, while the schematics may show a perfect alignment and spacing of the end faces of the teeth, a person of ordinary skill in the art will understand that manufacturing tolerances and material limitations may allow for some variation in tooth placement along a circumference and a thickness of the chain ring. These variations in placement may be expected and are understood as being encompassed within the specification and claims of this disclosure, with or without the use of the term "substantially" in each instance.

In addition, a width of a chain ring may be understood to be a thickness of a chain ring. As will be understood by any person of ordinary skill in the art, the thickness or width of the chain ring may vary at different portions. When the disclosure talks about a lateral position or position across the width or thickness of one or more teeth, it will be apparent to a person having ordinary skill in the art that a width or thickness at a circumference of the body, at a position where the teeth and/or the spaces between the teeth generally end, is the relevant location of the width or thickness for purposes of the present disclosure.

Figure 11:
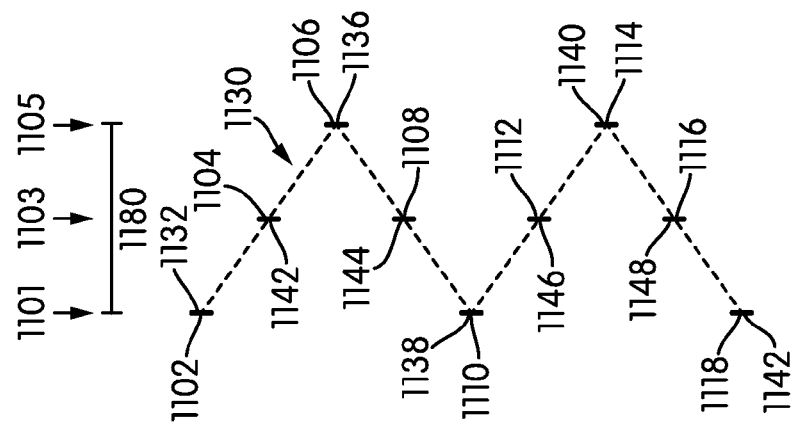
FIG. 11 is a schematic view showing one alternative embodiment of the chain ring in accordance with the disclosure.

Turning first to the pattern illustrated in FIG. 11, the pattern illustrated may be described as a regular, repeating pattern of four teeth. A first tooth 1102 may be positioned at a first lateral position 1101 across a thickness 1180 of a chain ring. A second tooth 1104 may be positioned at a second lateral position 1103 across the thickness 1180 of the chain ring. A third tooth 1106 may be positioned at a third lateral position 1105 across the thickness 1180 of the chain ring. The second tooth 1104 may be circumferentially between and circumferentially adjacent each of the first tooth 1102 and the third tooth 1106. A fourth tooth 1108 may be positioned at the second lateral position 1103 across the thickness 1180 of the chain ring. The pattern defined by the first tooth 1102, the second tooth 1104, the third tooth 1106, and the fourth tooth 1108 may be seen as repeating through each additional set of four teeth. For example, a fifth tooth 1110 may be positioned at the first lateral position 1101. A sixth tooth 1112 may be positioned at the second lateral position 1103. The seventh tooth 1114 may be positioned at the third lateral position 1105. The eighth tooth 1116 may be positioned at the second lateral position 1103. Finally, a ninth tooth 1118 may be positioned at the first lateral position 1101. As may be observed, the first lateral position 1101, the second lateral position 1103, and the third lateral position 1105 may differ from one another. The second lateral position 1103 may be laterally between the first lateral position 1101 and the third lateral position 1105. The spacing between the first and second positions may be the same as, or different from, the spacing between the second and third positions. The teeth of the chain ring may be thus serially spaced and occupy unique circumferential positions that no other tooth occupies. Moreover, each circumferentially uniquely-located tooth may occupy one of multiple lateral positions across the thickness of the chainring, and multiple circumferentially-spaced teeth may occupy the same lateral position.

It may be observed that because the pattern is a repeating pattern of four teeth, the pattern may be expressed as starting at any one tooth and ending at the fourth tooth therefrom. For example, the pattern may be expressed as beginning at the first tooth 1102 and ending at the fourth tooth 1108, as beginning at the second tooth 1104 and ending at the fifth tooth 1110, as beginning at the third tooth 1106 and ending at the sixth tooth 1112, or starting at the fourth tooth 1108 and ending at the seventh tooth 1114. In each instance, the series of four teeth may be described as a repeating pattern.

The first tooth 1102, the fifth tooth 1110, and the ninth tooth 1118 may each be positioned at the first lateral position. Three teeth, namely, the second tooth 1104, the third tooth 1106, and the fourth tooth 1108 may be circumferentially between the first tooth 1102 and the fifth tooth 1110. Similarly, three teeth, namely, the sixth tooth 1112, the seventh tooth 1114, and the eighth tooth 1116 may be circumferentially between the fifth tooth 1110 and the ninth tooth 1118. As may be observed, of the three teeth between respective sets of the two teeth in the first lateral position, two may be positioned in the second lateral position and one tooth may be positioned in the third lateral position. The tooth in the third lateral position may be circumferentially between the two teeth in the second lateral position. For example, the first tooth 1102 and the fifth tooth 1110 may be each positioned in the first lateral position 1101. Two teeth, namely, the second tooth 1104 and the fourth tooth 1108 may be both positioned at the second lateral position and may be circumferentially between the first tooth 1102 and the fifth tooth 1110. One tooth, namely, the third tooth 1106, may be positioned at the third lateral position 1105 and may be immediately circumferentially between the second tooth 1104 and the fourth tooth 1108 and may also be circumferentially between the first tooth 1102 and the fifth tooth 1110.

As may further be seen in FIG. 11, each end face can be seen as having a centerpoint. A substantially undulating pattern can be seen by drawing a line or curve between centerpoints of adjacent teeth. This pattern is drawn schematically in FIG. 11 by the dashed line 1130. In the embodiment of FIG. 11, the substantially undulating pattern is a triangle wave.

In the embodiment of FIG. 11, some of the centerpoints of the tooth end faces may be seen as being positioned at a peak or valley of the substantially undulating pattern 1130. Others of the centerpoints of the tooth end faces may be seen as being positioned away from a peak or valley of the substantially undulating pattern 1130. For example, a first centerpoint 1132, a second centerpoint 1138, and a third centerpoint 1142 may each be seen as being positioned at respective valleys of the substantially undulating pattern 1130. A fourth centerpoint 1136 and a fifth centerpoint 1140 may each be seen as being positioned at respective peaks of the substantially undulating pattern 1130. A sixth centerpoint 1142, a seventh centerpoint 1144, an eighth centerpoint 1146, and a ninth centerpoint 1148 may each be seen as being positioned away from either a peak or a valley of the substantially undulating pattern 1130.

In the embodiment of FIG. 11, because the substantially undulating pattern 1130 may be regular around a circumference of the chain ring, there may be a predictable proportion of the teeth that are positioned at each lateral position. In the embodiment of FIG. 11, a quarter of the teeth may be positioned at the first lateral position 1101, a quarter of the teeth may be positioned at the third lateral position 1105, and half the teeth may be positioned at the second lateral position.

The embodiment of FIG. 11 may be most suitable in configurations where the chain ring has a number of teeth that is divisible by four, i.e., 32, 36, 40, or 44. The regular four-tooth pattern of FIG. 11 is unlikely to be used on a chain ring that includes a number of teeth not divisible by four. This is because the precise regularity of the pattern may be broken when the number of teeth is not divisible by four.

A detailed chain ring showing another possible embodiment of the chain ring of FIG. 11 is shown in FIGS. 18-22. The embodiment shown in FIGS. 18-22 is of a chain ring that includes 32 teeth. Accordingly the number of teeth is divisible by four and can be formed into the regular undulating pattern shown in FIG. 11. The side views of the embodiments shown in FIGS. 18 and 22 are taken from the "outboard" side of the chain ring. It will be apparent to a person having ordinary skill in the art that the opposite side of the chain ring may substantially be a mirror image of the side shown in FIGS. 18 and 22. Accordingly, the tooth pattern shown in FIG. 11 may instead be shown as a mirror image, depending on which way the chain ring is oriented or held. This aspect of the FIGS. will be apparent to a person having ordinary skill in the art.

Turning first to FIG. 18, the chain ring 1800 may include a body 1802 and a plurality of teeth 1804 circumferentially affixed or affixed around a circumference 1806 of the body 1802. The teeth 1804 in this embodiment may be discussed in the disclosure as being positioned circumferentially with respect to one another. A first tooth 1808 may be circumferentially spaced from a second tooth 1810. In the embodiment disclosed in FIG. 18, the first tooth 1808 and the second tooth 1810 may be described as having three teeth, specifically the third tooth 1812, the fourth tooth 1814, and the fifth tooth 1816, circumferentially between the first tooth 1808 and the second tooth 1810. Similarly, the third tooth 1812 may be described as being circumferentially adjacent the first tooth 1808 and the fourth tooth 1814. When discussing any tooth 1804 circumferentially with respect to any other tooth 1804, the lateral position, i.e., the position of the tooth 1804 along or across a thickness of the chain ring body 1802 is not important.

In some embodiments, the chain ring 1800 may be machined from a single piece of metal or other desirable composite. In some embodiments, the body 1802 of the chain ring 1800 may be formed by machining, punching, or other suitable method. In some embodiments, the body 1802 may be made of more than one piece, and the pieces joined together, for example, by welding or sintering. The body may then be placed on a rotating jig and the sides of the teeth 1804 may be tapered by abrading the sides of the teeth to form a taper on each side of the chain ring. Only one side of the chain ring 1800 is shown, so only one side of the taper 1813 is shown in FIG. 18. The teeth shapes may then be machined in any conventional manner.

Turning to FIGS. 19-21, the taper and tooth shape may be more clearly shown. Each of FIGS. 19-21 shows a cross-section of the tooth along a line that is a radius, diameter, or portion thereof across the chain ring 1800. Turning first to FIG. 19, there is shown a cross section of a tooth having a configuration substantially similar or identical to first tooth 1808 and second tooth 1810. As shown in FIG. 19, a representative first inboard tooth 1908 and a representative second inboard tooth 1910 may each be attached at a first lateral position 1909 along a thickness 1911 of the body 1802 of the chain ring 1800. Each of the inboard teeth 1908, 1910 may have a generally trapezoidal cross-sectional shape along this line. Each of these teeth 1908, 1910 may have a generally hat-shaped cross section (like that shown in FIG. 9) when taken along a cross-sectional line perpendicular to the cross-section taken (a perpendicular cross-sectional line). As shown in FIG. 19, each of the inboard teeth 1908, 1910 may have a taper 1913, 1915, respectively, that may cause each of the inboard teeth 1908, 1910 to taper to a line 1917, 1919, respectively. Each of the tapered surfaces 1913, 1915 may represent an end face of the respective tooth 1908, 1910 and may be substantially rectangular, as may be better seen in FIG. 18.

FIG. 20 shows a cross-sectional view of a representative outboard tooth 2014, having a configuration substantially similar or identical to the outboard tooth 1814 shown in FIG. 18. The cross-section of FIG. 20 is simplified and includes only the tooth on one side of the chain ring 1800. A person having ordinary skill in the art will understand that a full-cross section would demonstrate more clearly that any representative outboard tooth may be a mirror image of any representative inboard tooth, as may be observed through a comparison of FIGS. 19 and 20. As shown in FIG. 20, a representative first outboard tooth 2014 may be attached at a third lateral position 2021 along a thickness 1911 of the body 1802 of the chain ring 1800. Each outboard tooth 2014 may have a generally trapezoidal cross-sectional shape along this line. Each outboard tooth 2014 may have a generally hat-shaped cross section (like that shown in FIG. 10) when taken along a perpendicular cross-sectional line. As shown in FIG. 20, each outboard tooth 2014 may have a tapered surface 2023 that may cause each of the outboard teeth 2014 to taper to a line 2025. Each tapered surface 2023 may represent an end face of the outboard tooth 2014 and may be substantially rectangular, as may be better seen in FIG. 18.

FIG. 21 shows a cross-sectional view of a representative middle tooth 2112, having a configuration substantially similar or identical to either the middle tooth 1812 or the middle tooth 1816 shown in FIG. 18. The cross-section of FIG. 21 is simplified and includes only the tooth on one side of the chain ring 1800. As shown in FIG. 21, a representative middle tooth 2112 may be attached at a second lateral position 2127 along a thickness 1911 of the body 1802 of the chain ring 1800. Each middle tooth 2112 may have a generally rectangular cross-sectional shape with one pointed end along this line. Each middle tooth 2112 may have a generally rectangular cross section when taken along a perpendicular cross-sectional line. As shown in FIG. 21, each middle tooth 2112 may have an outboard tapered surface 2129 and an inboard tapered surface 2131 that may cause each of the middle teeth 2112 to taper to a line 2133. The combined tapered surfaces 2129, 2131 may represent an end face of the middle tooth 2112 and may be substantially rectangular, as may be better seen in FIG. 18.

The above description of the configuration, shapes, and tapers of the teeth described in FIGS. 18-21 may be somewhat simplified. Turning to FIG. 22, a more detailed view of the teeth may be seen. As shown in FIG. 22, when the shapes of the teeth 1804 are machined, there may be discontinuities introduced in to the outer periphery of each tooth 1804. As an example, a representative inboard tooth 1908 may not have a precisely rectangular tapered end face 1915. Instead, the end face may include various angled portions that appear more tree-shaped upon closer examination. However, such a configuration may fall within the definition of a substantially rectangular shape. Similar discontinuities may be present for any representative middle tooth 2112 and outboard tooth 2014. Precise configuration details may differ according to the desires of any person having ordinary skill in the art.

Figure 12:
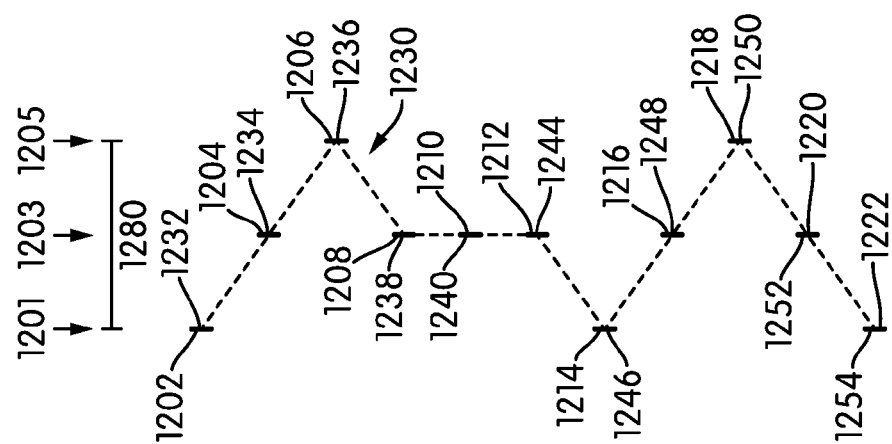
FIG. 12 is a schematic view showing another alternative embodiment of the chain ring in accordance with the disclosure.

Turning now to FIG. 12, a configuration of teeth that may be added or substituted for the embodiment of FIG. 11 may be seen. In the embodiment of FIG. 12, a repeating pattern of teeth in a second lateral position is added. Such a repeating pattern may be used if, for example, a chain ring is used that has an even number of teeth that is not divisible by four, i.e., 34, 38, 42, or 46. In such a configuration, the addition of two teeth in the second lateral position may be desirable. Of course, a person having ordinary skill in the art may elect to add a repeating pattern of teeth in the second lateral position in any position along the chain ring. Indeed, in a conventional chain ring, all the teeth may be considered to be in a middle, or second, lateral position. In many ways, the position of the teeth in FIG. 12 is similar to that in FIG. 11.

A first tooth 1202 may be positioned at a first lateral position 1201 across a thickness 1280 of a chain ring. A second tooth 1204 may be positioned at a second lateral position 1203 across the thickness 1280 of the chain ring. A third tooth 1206 may be positioned at a third lateral position 1205 across the thickness 1280 of the chain ring. The second tooth 1204 may be circumferentially between and circumferentially adjacent each of the first tooth 1202 and the third tooth 1206. A fourth tooth 1208 may be positioned at the second lateral position 1203 across the thickness 1280 of the chain ring. After the fourth tooth 1208, the four-tooth pattern may be seen as being broken. Instead, a fifth tooth 1210 and a sixth tooth 1212 may be positioned at the second lateral position 1203 circumferentially adjacent the fourth tooth 1208. The pattern defined by the first tooth 1202, the second tooth 1204, the third tooth 1206, and the fourth tooth 1208 may be seen as then repeating through each additional set of four teeth. For example, a seventh tooth 1214 may be positioned at the first lateral position 1201. An eighth tooth 1216 may be positioned at the second lateral position 1203. The ninth tooth 1218 may be positioned at the third lateral position 1205. The tenth tooth 1220 may be positioned at the second lateral position 1203. Finally, an eleventh tooth 1222 may be positioned at the first lateral position 1201. As may be observed, the first lateral position 1201, the second lateral position 1203, and the third lateral position 1205 may differ from one another. The second lateral position 1203 may be laterally between the first lateral position 1201 and the third lateral position 1205. The spacing between the first and second positions may be the same as, or different from, the spacing between the second and third positions.

The first tooth 1202, the seventh tooth 1214, and the eleventh tooth 1222 may each be positioned at the first lateral position. Five teeth, namely, the second tooth 1204, the third tooth 1206, the fourth tooth 1208, the fifth tooth 1210, and the sixth tooth 1212 may be circumferentially between the first tooth 1202 and the seventh tooth 1214. Similarly, three teeth, namely, the eighth tooth 1216, the ninth tooth 1218, and the tenth tooth 1220 may be circumferentially between the seventh tooth 1214 and the eleventh tooth 1222. As may be observed, of the teeth disposed circumferentially between the two closest teeth in the first lateral position 1201, at least two of the teeth may be positioned in the second lateral position 1203 and one tooth may be positioned in the third lateral position 1205. The tooth in the third lateral position 1205 may be circumferentially between the two teeth in the second lateral position 1203. For example, first tooth 1202 and the seventh tooth 1214 may be each positioned in the first lateral position 1201. Four teeth, namely, second tooth 1204, fourth tooth 1208, fifth tooth 1210, and sixth tooth 1212 may each be positioned at the second lateral position and may be circumferentially between the first tooth 1202 and the seventh tooth 1214. One tooth, namely, third tooth 1206, may be positioned at the third lateral position 1205 and may be circumferentially between the second tooth 1204 and the fourth tooth 1208 and may be circumferentially between the first tooth 1202 and the seventh tooth 1214.

As may further be seen in FIG. 12, each end face can be seen as having a centerpoint. A substantially undulating pattern can be seen by drawing a line or curve between centerpoints of adjacent teeth. This pattern is drawn schematically in FIG. 12 by the dashed line 1230.

In the embodiment of FIG. 12, some of the centerpoints of the tooth end faces may be seen as being positioned at a peak or valley of the substantially undulating pattern 1230. Others of the centerpoints of the tooth end faces may be seen as being positioned away from a peak or valley of the substantially undulating pattern 1230. For example, a first centerpoint 1232, a second centerpoint 1246, and a third centerpoint 1254 may each be seen as being positioned at respective valleys of the substantially undulating pattern 1230. A fourth centerpoint 1236 and a fifth centerpoint 1250 may each be seen as being positioned at respective peaks of the substantially undulating pattern 1230. A sixth centerpoint 1234, a seventh centerpoint 1238, an eighth centerpoint 1240, a ninth centerpoint 1244, a tenth centerpoint 1248, and an eleventh centerpoint 1252 may each be seen as being positioned away from either a peak or valley of the substantially undulating pattern 1230.

In the embodiment of FIG. 12, because the substantially undulating pattern 1230 may have a generally consistent pattern around a circumference of the chain ring, there may be a predictable proportion of the teeth that are positioned at each lateral position. In the embodiment of FIG. 12, about a quarter of the teeth may be positioned at the first lateral position 1201, about a quarter of the teeth may be positioned at the third lateral position 1205, and just over half the teeth may be positioned at the second lateral position 1203. If the pattern of repeated teeth in the second lateral position (like the teeth 1210 and 1212) is included more than once around the circumference of the chain ring, the proportion of teeth in the second lateral position 1203 may be increased and that the proportion of teeth in each of the first lateral position 1201 and the third lateral position 1205 may be decreased. However, at least half the teeth in such a configuration may be positioned in the second lateral position.

A detailed chain ring showing one possible embodiment of the chain ring of FIG. 12 is shown in FIGS. 23-27. The embodiment shown in FIGS. 23-27 is of a chain ring that includes 34 teeth. Accordingly the number of teeth is not divisible by four and cannot be formed into the regular undulating pattern shown in FIG. 11. Instead, two additional middle teeth are included, like the configuration shown in FIG. 12. This repeated middle tooth is shown in the area marked generally as 2350 in FIGS. 23 and 27. The side views of the embodiments shown in FIGS. 23 and 27 are taken from the "outboard" side of the chain ring. It will be apparent to a person having ordinary skill in the art that the opposite side of the chain ring may substantially be a mirror image of the side shown in FIGS. 23 and 27. Accordingly, the tooth pattern shown in FIG. 12 may instead be shown as a mirror image, depending on which way the chain ring is oriented or held. This aspect of the FIGS. will be apparent to a person having ordinary skill in the art.

Turning first to FIG. 23, the chain ring 2300 may include a body 2302 and a plurality of teeth 2304 circumferentially affixed or affixed around a circumference 2306 of the body 2302. The teeth 2304 in this embodiment may be discussed in the disclosure as being positioned circumferentially with respect to one another. A first tooth 2308 may be circumferentially spaced from a second tooth 2310. In the embodiment disclosed in FIG. 23, the first tooth 2308 and the second tooth 2310 may be described as having five teeth, specifically the third tooth 2312, the fourth tooth 2314, the fifth tooth 2316, the sixth tooth 2318, and the seventh tooth 2320, circumferentially between the first tooth 2308 and the second tooth 2310. Similarly, the third tooth 2312 may be described as being circumferentially adjacent the first tooth 2308 and the fourth tooth 2314. When discussing any tooth 2304 circumferentially with respect to any other tooth 2304, the lateral position, i.e., the position of the tooth 2304 along or across a thickness of the chain ring body 2302 is not important.

In some embodiments, the chain ring 2300 may be machined from a single piece of metal or other desirable composite. In some embodiments, the body 2302 of the chain ring 2300 may be formed by machining, punching, or other suitable method. In some embodiments, the body 2302 may be made of more than one piece, and the pieces joined together, for example, by welding or sintering. The body may then be placed on a rotating jig and the sides of the teeth 2304 may be tapered by abrading the sides of the teeth to form a taper on each side of the chain ring. Only one side of the chain ring 2300 is shown, so only one side of the taper 2313 is shown in FIG. 23. The teeth shapes may then be machined in any conventional manner.

Turning to FIGS. 24-26, the taper and tooth shape may be more clearly shown. Each of FIGS. 24-26 shows a cross-section of the tooth along a line that is a radius, diameter, or portion thereof across the chain ring 2300. Turning first to FIG. 24, there is shown a cross section of a tooth having a configuration substantially similar or identical to first tooth 2308 and second tooth 2310. As shown in FIG. 24, a representative first inboard tooth 2408 may be attached at a first lateral position 2409 along a thickness 2411 of the body 2302 of the chain ring 2300. Each inboard tooth 2308 may have a generally trapezoidal cross-sectional shape along this line. Each inboard tooth 2308 may have a generally hat-shaped cross section (like that shown in FIG. 9) when taken along a perpendicular cross-sectional line. As shown in FIG. 24, each of the inboard teeth 2408 may have a tapered surface 2413 that may cause each of the inboard teeth 2408 to taper to a line 2417. Each of the tapered surfaces 2413 may represent an end face of the respective inboard tooth 2408 and may be substantially rectangular, as may be better seen in FIG. 23. It is noted that because the number of teeth on the chain ring shown in FIG. 23-27 is not divisible by 4, the teeth on opposite sides of the chain ring may not share the same cross-sectional shape, unlike the embodiment of FIGS. 18-22.

FIG. 25 shows a cross-sectional view of a representative outboard tooth 2518, having a configuration substantially similar or identical to the outboard tooth 2318 shown in FIG. 23. The cross-section of FIG. 25 is simplified and includes only the tooth on one side of the chain ring 2300. A person having ordinary skill in the art will understand that a full-cross section would demonstrate more clearly that any representative outboard tooth may be a mirror image of any representative inboard tooth, as may be seen in a comparison of FIGS. 24 and 25. As shown in FIG. 25, a representative first outboard tooth 2518 may be attached at a third lateral position 2521 along a thickness 2411 of the body 2302 of the chain ring 2300. Each outboard tooth 2518 may have a generally trapezoidal cross-sectional shape along this line. Each outboard tooth 2518 may have a generally hat-shaped cross section (like that shown in FIG. 10) when taken along a perpendicular cross-sectional line. As shown in FIG. 25, each outboard tooth 2518 may have a tapered surface 2523 that may cause each of the outboard teeth 2518 to taper to a line 2525. Each tapered surface 2523 may represent an end face of the outboard tooth 2518 and may be substantially rectangular, as may be better seen in FIG. 23.

FIG. 26 shows a cross-sectional view of a representative middle tooth 2612, having a configuration substantially similar or identical to the middle tooth 2312, the middle tooth 2314, the middle tooth 2316, or the middle tooth 2320 shown in FIG. 20. The cross-section of FIG. 26 is simplified and includes only the tooth on one side of the chain ring 2300. As shown in FIG. 26, a representative middle tooth 2612 may be attached at a second lateral position 2627 along a thickness 2411 of the body 2302 of the chain ring 2300. Each middle tooth 2612 may have a generally rectangular cross-sectional shape with one pointed end in the cross-section taken along this line. Each middle tooth 2612 may have a generally rectangular cross section when taken along a perpendicular cross-sectional line. As shown in FIG. 26, each middle tooth 2612 may have an outboard tapered surface 2629 and an inboard tapered surface 2631 that may cause each of the middle teeth 2612 to taper to a line 2633. The combined tapered surfaces 2629, 2631 may represent an end face of the middle tooth 2612 and may be substantially rectangular, as may be better seen in FIG. 23.

The above description of the configuration, shapes, and tapers of the teeth described in FIGS. 23-26 may be somewhat simplified. Turning to FIG. 27, a more detailed view of the teeth may be seen. As shown in FIG. 27, when the shapes of the teeth 2304 are machined, cast, or otherwise formed, there may be discontinuities introduced in to the outer periphery of each tooth 2304. As an example, a representative inboard tooth 2408 may not have a precisely rectangular tapered end face 2415. Instead, the end face may include various angled portions that appear more tree-shaped upon closer examination. However, such a configuration may fall within the definition of a substantially rectangular shape. Similar discontinuities may be present for any representative middle tooth 2612 and outboard tooth 2518. Precise configuration details may differ according to the desires of any person having ordinary skill in the art.

Figure 13:
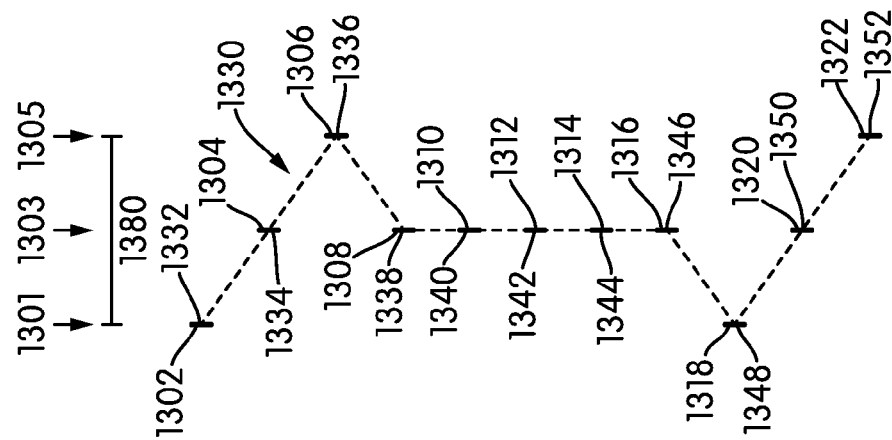
FIG. 13 is a schematic view showing another alternative embodiment of the chain ring in accordance with the disclosure.

Turning now to FIG. 13, an exaggerated version of the embodiment of FIG. 12 may be found. In the embodiment of FIG. 13, a larger plurality of teeth is located in the second lateral position than in the embodiment of FIG. 12. A person having ordinary skill in the art may elect to include such a design if they feel that a run of teeth in the second lateral position is desirable for any reason.

A first tooth 1302 may be positioned at a first lateral position 1301 across a thickness 1380 of a chain ring. A second tooth 1304 may be positioned at a second lateral position 1303 across the thickness 1380 of the chain ring. A third tooth 1306 may be positioned at a third lateral position 1305 across the thickness 1380 of the chain ring. The second tooth 1304 may be circumferentially between and circumferentially adjacent each of the first tooth 1302 and the third tooth 1306. A fourth tooth 1308 may be positioned at the second lateral position 1303 across the thickness 1380 of the chain ring. After the fourth tooth 1308, the four-tooth pattern may be seen as being broken. Instead, a fifth tooth 1310, a sixth tooth 1312, a seventh tooth 1314, and an eighth tooth 1316 may be positioned at the second lateral position circumferentially adjacent the fourth tooth 1308. The pattern defined by the first tooth 1302, the second tooth 1304, the third tooth 1306, and the fourth tooth 1308 may be seen as then repeating through each additional set of four teeth. For example, a ninth tooth 1318 may be positioned at the first lateral position 1301. A tenth tooth 1320 may be positioned at the second lateral position 1303. An eleventh tooth 1322 may be positioned at the third lateral position 1305. Finally, a twelfth tooth (not shown) may be positioned at the second lateral position 1303. As may be observed, the first lateral position 1301, the second lateral position 1303, and the third lateral position 1305 may differ from one another. The second lateral position 1303 may be laterally between the first lateral position 1301 and the third lateral position 1305. The spacing between the first and second positions may be the same as, or different from, the spacing between the second and third positions.

The first tooth 1302 and the ninth tooth 1318 may each be positioned at the first lateral position 1301. Seven teeth, namely, the second tooth 1304, the third tooth 1306, the fourth tooth 1308, the fifth tooth 1310, the sixth tooth 1312, the seventh tooth 1314, and the eighth tooth 1316 may be circumferentially between the first tooth 1302 and the ninth tooth 1318. As may be observed, of the teeth disposed circumferentially between the two closest teeth in the first lateral position, at least two of the teeth may be positioned in the second lateral position 1303 and one tooth may be positioned in the third lateral position 1305. The tooth in the third lateral position 1305 may be circumferentially between the two teeth in the second lateral position 1303. For example, the first tooth 1302 and the ninth tooth 1318 may be each positioned in the first lateral position 1301. Six teeth, namely, second tooth 1304, fourth tooth 1308, fifth tooth 1310, sixth tooth 1312, seventh tooth 1314, and eighth tooth 1316 may each be positioned at the second lateral position and may be circumferentially between the first tooth 1302 and the seventh tooth 1314. One tooth, namely, third tooth 1306, may be positioned at the third lateral position 1305 and may be circumferentially immediately between the second tooth 1304 and the fourth tooth 1308 and may also be circumferentially between the first tooth 1302 and the ninth tooth 1318.

As may further be seen in FIG. 13, each end face can be seen as having a centerpoint. A substantially undulating pattern can be seen by drawing a line or curve between centerpoints of adjacent teeth. This pattern is drawn schematically in FIG. 13 by the dashed line 1330.

In the embodiment of FIG. 13, some of the centerpoints of the tooth end faces may be seen as being positioned at a peak or valley of the substantially undulating pattern 1330. Others of the centerpoints of the tooth end faces may be seen as being positioned away from a peak or valley of the substantially undulating pattern 1330. For example, a first centerpoint 1332 and a second centerpoint 1348 may each be seen as being positioned at respective valleys of the substantially undulating pattern 1330. A third centerpoint 1336 and a fourth centerpoint 1352 may each be seen as being positioned at respective peaks of the substantially undulating pattern 1330. A fifth centerpoint 1334, a sixth centerpoint 1338, a seventh centerpoint 1340, an eighth centerpoint 1342, a ninth centerpoint 1344, a tenth centerpoint 1346, and an eleventh centerpoint 1350 may each be seen as being positioned away from either a peak or valley of the substantially undulating pattern 1330.

In the embodiment of FIG. 13, because the substantially undulating pattern 1330 may have a generally consistent pattern around a circumference of the chain ring, there may be a predictable proportion of the teeth that are positioned at each lateral position. In the embodiment of FIG. 13, somewhat less than about a quarter of the teeth may be positioned at the first lateral position 1301, somewhat less than about a quarter of the teeth may be positioned at the third lateral position 1305, and just over half the teeth may be positioned at the second lateral position 1303. If the pattern of repeated teeth in the second lateral position (like the teeth 1310, 1312, 1314, and 1316) is included more than once around the circumference of the chain ring, the proportion of teeth in the second lateral position 1303 may be increased and the proportion in each of the first lateral position 1301 and the third lateral position 1305 may be decreased. However, at least half the teeth in such a configuration may be positioned in the second lateral position.

Figure 14:
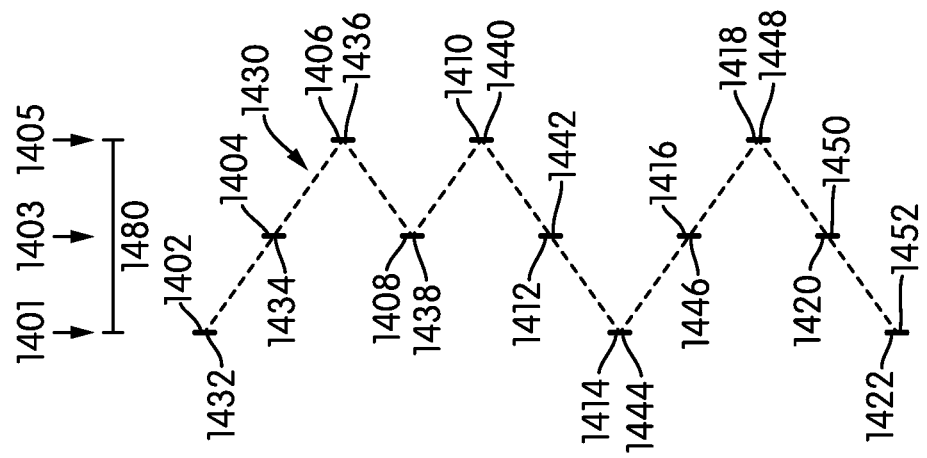
FIG. 14 is a schematic view showing another alternative embodiment of the chain ring in accordance with the disclosure.

Turning now to FIG. 14, a person having ordinary skill in the art may select a repeating pattern of a tooth in one of the first or third lateral position followed by a tooth in the second lateral position. Such a pattern may be used if, for example, a chain ring is used that has an even number of teeth that is not divisible by four, i.e., 34, 38, 42, or 46. In such a configuration, the addition of two teeth, one each in the second lateral position and in one of the first or third lateral position may be desirable. Of course, a person having ordinary skill in the art may elect to add such a pattern of teeth in any position along the chain ring.

A first tooth 1402 may be positioned at a first lateral position 1401 across a thickness 1480 of a chain ring. A second tooth 1404 may be positioned at a second lateral position 1403 across the thickness 1480 of the chain ring. A third tooth 1406 may be positioned at a third lateral position 1405 across the thickness 1480 of the chain ring. The second tooth 1404 may be circumferentially between and circumferentially adjacent each of the first tooth 1402 and the third tooth 1406. A fourth tooth 1408 may be positioned at the second lateral position 1403 across the thickness 1480 of the chain ring. After the fourth tooth 1408, the four-tooth pattern may be seen as being broken. Instead, a fifth tooth 1410 may be positioned at the third lateral position 1405 and a sixth tooth 1412 may be positioned at the second lateral position 1403. In an alternative embodiment (not shown), the fifth tooth may be positioned instead at the first lateral position 1401 instead of the third lateral position 1405. The pattern defined by the first tooth 1402, the second tooth 1404, the third tooth 1406, and the fourth tooth 1408 may be seen as then repeating through each additional set of four teeth. For example, a seventh tooth 1414 may be positioned at the first lateral position 1401. An eighth tooth 1416 may be positioned at the second lateral position 1403. A ninth tooth 1418 may be positioned at the third lateral position 1405. A tenth tooth 1420 may be positioned at the second lateral position 1403. Finally, an eleventh tooth 1422 may be positioned at the first lateral position 1401. As may be observed, the first lateral position 1401, the second lateral position 1403, and the third lateral position 1405 may differ from one another. The second lateral position 1403 may be laterally between the first lateral position 1401 and the third lateral position 1405. The spacing between the first and second positions may be the same as, or different from, the spacing between the second and third positions.

The first tooth 1402, the seventh tooth 1414, and the eleventh tooth 1422 may each be positioned at the first lateral position. Five teeth, namely, the second tooth 1404, the third tooth 1406, the fourth tooth 1408, the fifth tooth 1410, and the sixth tooth 1412 may be circumferentially between the first tooth 1402 and the seventh tooth 1414. Similarly, three teeth, namely, the eighth tooth 1416, the ninth tooth 1418, and the tenth tooth 1420 may be circumferentially between the seventh tooth 1414 and the eleventh tooth 1422. As may be observed, of the teeth disposed circumferentially between the two closest teeth in the first lateral position 1401, at least two of the teeth may be positioned in the second lateral position 1403 and at least one tooth may be positioned in the third lateral position 1405. Each tooth in the third lateral position 1405 may be circumferentially between the two teeth in the second lateral position 1403. For example, first tooth 1402 and the seventh tooth 1414 may be each positioned in the first lateral position 1401. Three teeth, namely, second tooth 1404, fourth tooth 1408, and sixth tooth 1412 may each be positioned at the second lateral position and may be circumferentially between the first tooth 1402 and the seventh tooth 1414. Two teeth, namely, third tooth 1406 and fifth tooth 1410, may be positioned at the third lateral position 1405 and may each be circumferentially between two teeth in the second lateral position. The third tooth 1406 may be positioned between the second tooth 1404 and the fourth tooth 1408 and may be circumferentially between the first tooth 1402 and the seventh tooth 1414. The fifth tooth 1410 may be positioned circumferentially immediately between the fourth tooth 1408 and the sixth tooth 1412 and also may be circumferentially between the first tooth 1402 and the seventh tooth 1414.

As may further be seen in FIG. 14, each end face can be seen as having a centerpoint. A substantially undulating pattern can be seen by drawing a line or curve between centerpoints of adjacent teeth. This pattern is drawn schematically in FIG. 14 by the dashed line 1430.

In the embodiment of FIG. 14, some of the centerpoints of the tooth end faces may be seen as being positioned at a peak or valley of the substantially undulating pattern 1430. Others of the centerpoints of the tooth end faces may be seen as being positioned away from a peak or valley of the substantially undulating pattern 1430. For example, a first centerpoint 1432, a second centerpoint 1444, and a third centerpoint 1452 may each be seen as being positioned at respective valleys of the substantially undulating pattern 1430. A fourth centerpoint 1436, a fifth centerpoint 1440, and a sixth centerpoint 1448 may each be seen as being positioned at respective peaks of the substantially undulating pattern 1430. A seventh centerpoint 1434, an eighth centerpoint 1438, a ninth centerpoint 1442, a tenth centerpoint 1446, and an eleventh centerpoint 1450 may each be seen as being positioned away from either a peak or valley of the substantially undulating pattern 1430.

In the embodiment of FIG. 14, because the substantially undulating pattern 1430 may have a generally consistent pattern around a circumference of the chain ring, there may be a predictable proportion of the teeth that are positioned at each lateral position. In the embodiment of FIG. 14, about a quarter of the teeth may be positioned at the first lateral position 1401, about a quarter of the teeth may be positioned at the third lateral position 1405, and about half the teeth may be positioned at the second lateral position 1403. If the pattern of teeth in the two tooth pattern (like the teeth 1410 and 1412) is included more than once around the circumference of the chain ring, and if that pattern disproportionately uses a tooth (like tooth 1410) in one or the other of the first lateral position 1401 or the third lateral position 1405, the proportion of teeth in that lateral position may be increased and the proportion in the other of the first lateral position 1401 or the third lateral position 1405 may be decreased. However, at least half the teeth in such a situation may be positioned in the second lateral position 1403.

Figure 15:
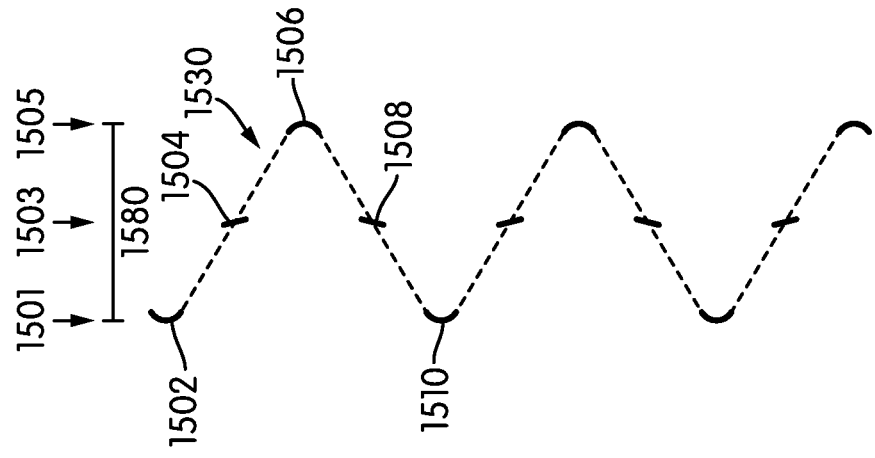
FIG. 15 is a schematic view showing another alternative embodiment of the chain ring in accordance with the disclosure.

The embodiment of FIG. 15 illustrates an alternative embodiment of tooth shape. While certain tooth shapes have been illustrated and described herein, these tooth shapes may be modified by a person having ordinary skill in the art to provide different aesthetic and/or functional features. For example, the embodiment of FIG. 15 illustrates one such embodiment. In the illustrated embodiment, the substantially undulating pattern 1530 between the teeth is more curved in a sine wave form than the triangular wave defined, for example, in FIG. 11. In such an embodiment, a first tooth 1502 and a fifth tooth 1510 in a first lateral position 1501 across the thickness 1580 of the chain ring may be shaped in a concave manner, with the concavity oriented toward the second lateral position 1503. A third tooth 1506 in a third lateral position 1505 may be shaped in a concave manner, with the concavity oriented toward the second lateral position 1503. Each of the second tooth 1504 and the fourth tooth 1508 may be positioned in the second lateral position. Each of the teeth in the second lateral position may be angled or canted to provide a more smoothed appearance between the curved adjacent teeth.

In many of the embodiments, the tooth shape shown is regular and symmetrical. However, such a tooth shape is not required. Any tooth shape thought to be desirable by a designer could be substituted in any of the embodiments shown. The tooth may instead be configured to be like that of the tooth 3300 shown in FIG. 33. A person having ordinary skill in the art will understand that the tooth shapes shown in any of the FIGS. are exemplary and not limiting.

Many different tooth appearances may be used and many different end shapes may be used and fall within the scope of the present disclosure and claims. For example, the end faces of the teeth could be stamped or shaped to spell a word, such as a rider's or team's name or logo. Indeed, instead of a curved taper, a sharper angle could be used to give a more aggressive appearance. The examples given are merely illustrative, however, and a person having ordinary skill in the art will be able to incorporate known and conceivable shapes into the teeth as may be desirable and/or economical for a given application or use.

Figure 17:
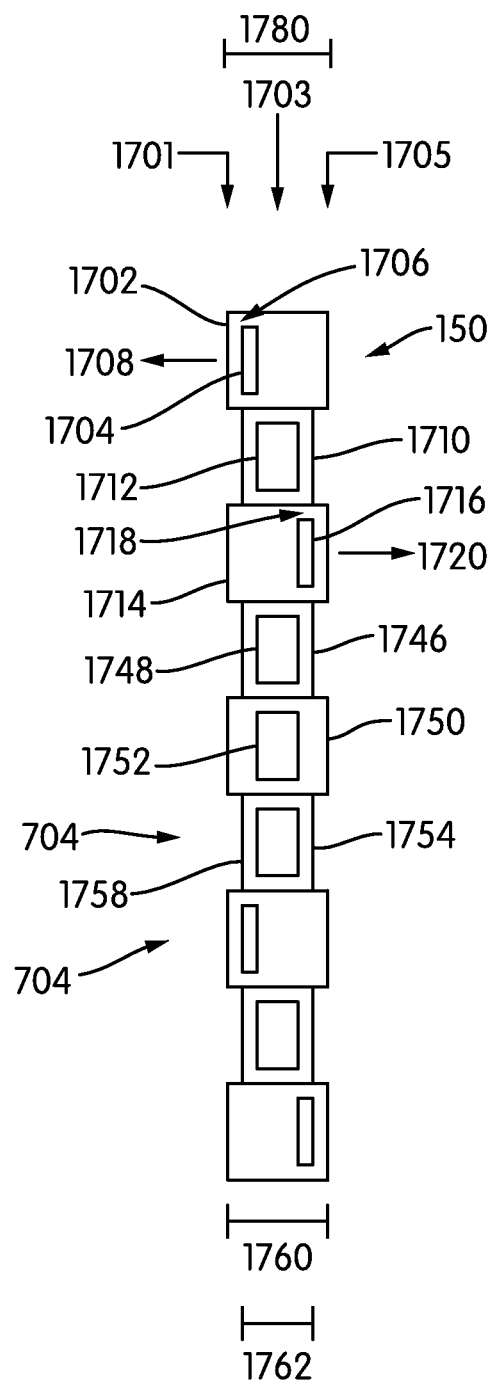
FIG. 17 is a sectional view of the embodiment of FIG. 16 taken along line 17-17 and illustrating a tooth configuration similar to that of FIG. 11.

Turning now to FIG. 17, the function of the various embodiments and how a person having ordinary skill in the art would select among various ones of the embodiments disclosed will be discussed. For purposes of discussion, FIG. 17 illustrates a chain ring having a tooth configuration represented in the schematic shown in FIG. 11 to illustrate how such a design would function in connection with the chain.

As shown in FIG. 16, the chain ring 700 may have a body 702 and a plurality of teeth 704 affixed around a circumference of the body 702. The teeth 704 may be configured to engage the chain 150 without shifting. The interaction of the chain 150 and the teeth 704 may be seen more clearly in FIG. 17. FIG. 17 shows a chain 150 that has a series of outer links and inner links as shown in FIG. 1. In order to simplify the view, the details of the manner in which the chain links are attached to one another have been eliminated to focus instead on the relative size, shape, and placement of the teeth and the chain links.

Because the chain 150 is configured to drive a bicycle forwardly, a forward face of each tooth 704 may be configured to engage a forward side of each chain link when the crank is pedaled to create force. This may transmit force to the rear wheel and power the bicycle. In the configuration of FIG. 17, some of the teeth 704 may also engage a lateral face of a corresponding chain link to impart a lateral force to the chain 150.

The chain 150 may include a first link 1702, which may be an outer link. The chain ring 700 may include a first tooth 1704, which may be positioned at a first lateral position 1701 across a thickness 1780 of the chain ring 700. The first tooth 1704 may be configured to engage the first link 1702 at its first lateral side 1706, thereby imparting a force to the chain 150 in a first lateral direction 1708. The chain 150 may include a second link 1710, which may be an inner link. The chain ring 700 may include a second tooth 1712, which may be positioned at a second lateral position 1703 across a thickness 1780 of the chain ring 700. The second tooth 1712 may be configured to fit within the second link 1710 without imparting a substantial lateral force to the chain 150. The chain 150 may include a third link 1714, which may be an outer link. The chain ring 700 may include a third tooth 1716, which may be positioned at a third lateral position 1705 across a thickness 1780 of the chain ring 700. The third tooth 1716 may be configured to engage the third link 1714 at its second lateral side 1718, thereby imparting a force to the chain 150 in a second lateral direction 1720.

In many of the embodiments disclosed, it was mentioned that the number of teeth in the first lateral position, such as first lateral position 1701, and the third lateral position, such as third lateral position 1705 may be about equal and may each be about a quarter of the teeth on given chain ring. Keeping the number of teeth in the first lateral position 1701 and the third lateral position 1703 approximately equal will lead to the lateral force in the first direction 1708 (the first lateral force) and the lateral force in the second direction 1720 (the second lateral force) to be approximately equal, which may be desirable in many embodiments. When either lateral force is applied to the chain 150, the chain 150 is permitted to flex in the direction of the respective lateral force. In many embodiments, the chain is permitted some lateral give or play due to its construction. The application of lateral force by the embodiments disclosed may provide additional security to the chain engagement.

In another configuration, the second tooth 1712 may be configured to transmit no net lateral force to the drive chain. For example, the second tooth 1712 may transmit substantially equivalent lateral forces in each of the first direction 1708 and the second direction 1720. In such a configuration, where the lateral forces are substantially equal, the second tooth 1712 may be considered as transmitting no lateral force. Similarly, in other configurations, the chain 150 may become misaligned. In such a configuration, the second tooth 1712 may transmit a lateral force to the chain 150 to correct such a misalignment, and then transmit no additional lateral force. Such a temporary application of force is also not considered a transmission of force in the context of the present disclosure.

Attention may also be drawn to the next series of three links and teeth. A fourth link 1746 may be an inner link. A fifth link 1750 may be an outer link. A sixth link 1754 may be an inner link. As may be expected, the fourth tooth 1748 and the sixth tooth 1758 may be positioned in a second lateral position 1703, and may impart little or no lateral force to the chain 150. In the illustrated embodiment, the fifth tooth 1752, rather than being positioned in a first lateral position 1701 or a third lateral position 1705, is instead positioned in the second lateral position 1703. A person having ordinary skill in the art will understand that an outer link of the chain 150 may have an increased width 1760 that may allow for a tooth 704 to be placed within the outer link of the chain 150 in any of the three lateral positions. The reduced width 1762 of the inner link of the chain 150 may limit the variety of lateral placements of a given tooth 704, and in many embodiments, may limit it to placement in the second lateral position 1703. A person having ordinary skill in the art may select an appropriate configuration of teeth given the spacing of a particular drive chain and the width of a particular chain ring.

In some embodiments, if additional pressure is desired on one or more links of a chain, the "second position" can be modified to incorporate two, three, or more positions. Such configurations may be seen in FIGS. 28 and 29.

Figure 28:
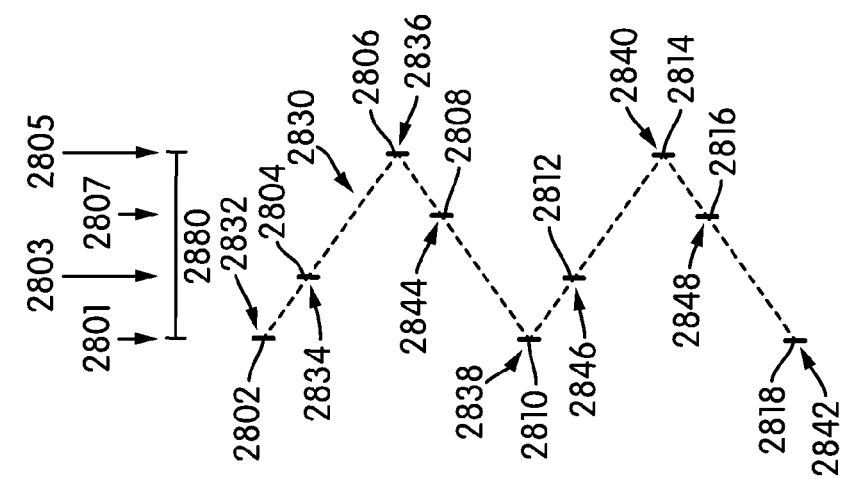
FIG. 28 is a schematic view showing another alternative embodiment of the chain ring in accordance with the disclosure.

Turning first to the pattern illustrated in FIG. 28, the pattern illustrated may be described as a regular, repeating pattern of four teeth. A first tooth 2802 may be positioned at a first lateral position 2801 across a thickness 2880 of a chain ring. A second tooth 2804 may be positioned at a second lateral position 2803 across the thickness 2880 of the chain ring. A third tooth 2806 may be positioned at a third lateral position 2805 across the thickness 2880 of the chain ring. The second tooth 2804 may be circumferentially between and circumferentially adjacent each of the first tooth 2802 and the third tooth 2806. A fourth tooth 2808 may be positioned at a fourth lateral position 2807 across the thickness 2880 of the chain ring. The pattern defined by the first tooth 2802, the second tooth 2804, the third tooth 2806, and the fourth tooth 2808 may be seen as repeating through each additional set of four teeth. For example, a fifth tooth 2810 may be positioned at the first lateral position 2801. A sixth tooth 2812 may be positioned at the second lateral position 2803. The seventh tooth 2814 may be positioned at the third lateral position 2805. The eighth tooth 2816 may be positioned at the fourth lateral position 2807. Finally, a ninth tooth 2818 may be positioned at the first lateral position 2801. As may be observed, the first lateral position 2801, the second lateral position 2803, the third lateral position 2805, and the fourth lateral position 2807 may differ from one another. The second lateral position 2803 may be laterally between the first lateral position 2801 and the third lateral position 2805. Similarly, the fourth lateral position 2807 may be laterally between the first lateral position 2801 and the third lateral position 2805. The spacing between some of the lateral positions may be the same as, or different from, the spacing between the other of the lateral positions.

It may be observed that because the pattern is a repeating pattern of four teeth, the pattern may be expressed as starting at any one tooth and ending at the fourth tooth therefrom. For example, the pattern may be expressed as beginning at the first tooth 2802 and ending at the fourth tooth 2808, as beginning at the second tooth 2804 and ending at the fifth tooth 2810, as beginning at the third tooth 2806 and ending at the sixth tooth 2812, or starting at the fourth tooth 2808 and ending at the seventh tooth 2814. In each instance, the series of four teeth may be described as a repeating pattern.

The first tooth 2802, the fifth tooth 2810, and the ninth tooth 2818 may each be positioned at the first lateral position. Three teeth, namely, the second tooth 2804, the third tooth 2806, and the fourth tooth 2808 may be circumferentially between the first tooth 2802 and the fifth tooth 2810. Similarly, three teeth, namely, the sixth tooth 2812, the seventh tooth 2814, and the eighth tooth 2816 may be circumferentially between the fifth tooth 2810 and the ninth tooth 2818. As may be observed, of the three teeth disposed circumferentially between the two closest teeth in the first lateral position, one tooth may be in each of the second, third, and fourth lateral positions. The tooth in the third lateral position may be circumferentially between the tooth in the second lateral position and the tooth in the fourth lateral position.

As may further be seen in FIG. 28, each end face can be seen as having a centerpoint. A substantially undulating pattern can be seen by drawing a line or curve between centerpoints of adjacent teeth. This pattern is drawn schematically in FIG. 28 by the dashed line 2830.

In the embodiment of FIG. 28, some of the centerpoints of the tooth end faces may be seen as being positioned at a peak or valley of the substantially undulating pattern 2830.

Others of the centerpoints of the tooth end faces may be seen as being positioned away from a peak or valley of the substantially undulating pattern 2830. For example, a first centerpoint 2832, a second centerpoint 2838, and a third centerpoint 2842 may each be seen as being positioned at respective valleys of the substantially undulating pattern 2830. A fourth centerpoint 2836 and a fifth centerpoint 2840 may each be seen as being positioned at respective peaks of the substantially undulating pattern 2830. A sixth centerpoint 2834, a seventh centerpoint 2844, an eighth centerpoint 2846, and a ninth centerpoint 2848 may each be seen as being positioned away from either a peak or valley of the substantially undulating pattern 2830.

In the embodiment of FIG. 28, because the substantially undulating pattern 2830 may be regular around a circumference of the chain ring, there may be a predictable proportion of the teeth that are positioned at each lateral position. In the embodiment of FIG. 28, a quarter of the teeth may be positioned at the first lateral position 2801, a quarter of the teeth may be positioned at the third lateral position 2805, and half the teeth may be positioned at either the second lateral position 2803 or the fourth lateral position 2807.

The embodiment of FIG. 28 may be most suitable in configurations where the chain ring has a number of teeth that is divisible by four, i.e., 32, 36, 40, or 44. The regular four-tooth pattern of FIG. 28 is unlikely to be used on a chain ring that includes a number of teeth not divisible by four. This is because the precise regularity of the pattern may be broken when the number of teeth is not divisible by four.

A person having ordinary skill in the art will understand, by comparing the embodiment of FIG. 28 to the embodiments of FIGS. 11-15 that in this configuration, the second lateral position 2803 and the fourth lateral position 2807 are substantially equivalent in placement to the second lateral position shown in the embodiments of FIGS. 11-15. The use of two spaced central positions in the embodiment shown in FIG. 28 is to modify the lateral forces placed on the chain as shown in FIG. 17.

In the embodiment shown in FIG. 17, the teeth are shown as being similar to that of FIG. 11. FIG. 30 shows how the embodiment of FIG. 28 would interact with the chain to perform a slightly modified function.

The chain 150 may include a first link 3002, which may be an outer link. The chain ring 700 may include a first tooth 3004, which may be positioned at a first lateral position 3001 across a thickness 3080 of the chain ring 700. The first tooth 3004 may be configured to engage the first link 3002 at its first lateral side 3006, thereby imparting a force to the chain 150 in a first lateral direction 3008. The chain 150 may include a second link 3010, which may be an inner link. The chain ring 700 may include a second tooth 3012, which may be positioned at a second lateral position 3003 across a thickness 3080 of the chain ring 700. The second tooth 3012 may be configured to fit within the second link 3010. The second tooth 3012 may be configured to engage the second link 3010 at its first lateral side 3011, thereby imparting a force to the chain 150 in the first lateral direction 3008. The chain 150 may include a third link 3014, which may be an outer link. The chain ring 700 may include a third tooth 3016, which may be positioned at a third lateral position 3005 across a thickness 3080 of the chain ring 700. The third tooth 3016 may be configured to engage the third link 3014 at its second lateral side 3018, thereby imparting a force to the chain 150 in a second lateral direction 3020. The chain ring 700 may include a fourth tooth 3022, which may be positioned at a fourth lateral position 3007 across a thickness 3080 of the chain ring 700. The fourth tooth 3022 may be configured to fit within a fourth link 3024, which may be an inner link. The fourth tooth 3022 may be configured to engage the fourth link 3024 at its second lateral side 3026, thereby imparting a force to the chain 150 in the second lateral direction 3020.

In many embodiments with four lateral positions, it may be helpful to maintain the number of teeth in each lateral position to be approximately equivalent. Keeping the combined number of teeth in the first lateral position 3001 and the second lateral position 3003 approximately equal to the combined number of teeth in the third lateral position 3005 and the fourth lateral position 3007 will cause the lateral force in the first direction 3008 (the first lateral force) and the lateral force in the second direction 3020 (the second lateral force) to be approximately equal, which may be desirable in many embodiments. When either lateral force is applied to the chain 150, the chain 150 is permitted to flex in the direction of the respective lateral force. In many embodiments, the chain is permitted some lateral give or play due to its construction. The application of lateral force by the embodiments disclosed may provide additional security to the chain engagement.

With respect to the embodiment of FIG. 28, it will be apparent to a person having ordinary skill in the art that teeth in the second lateral position 2803 and the teeth in the fourth lateral position 2807 combine to perform the function of the teeth in the second lateral position, as disclosed in other embodiments, e.g. second lateral position 1103 as described in connection with FIG. 11 above, while accommodating variations in positions of the abutting faces of the chain due to variations in link width. While FIG. 28 describes a progression of the teeth going from first to second to third to fourth lateral positions, the person having ordinary skill in the art may instead switch the position of any tooth in the second lateral position to the fourth lateral position and vice versa. Similarly, a person having ordinary skill in the art may modify the design of FIG. 28 to incorporate the teachings found in any of the schematics of FIGS. 11-15 and the related description to incorporate the fourth lateral position within those designs.

Figure 29:
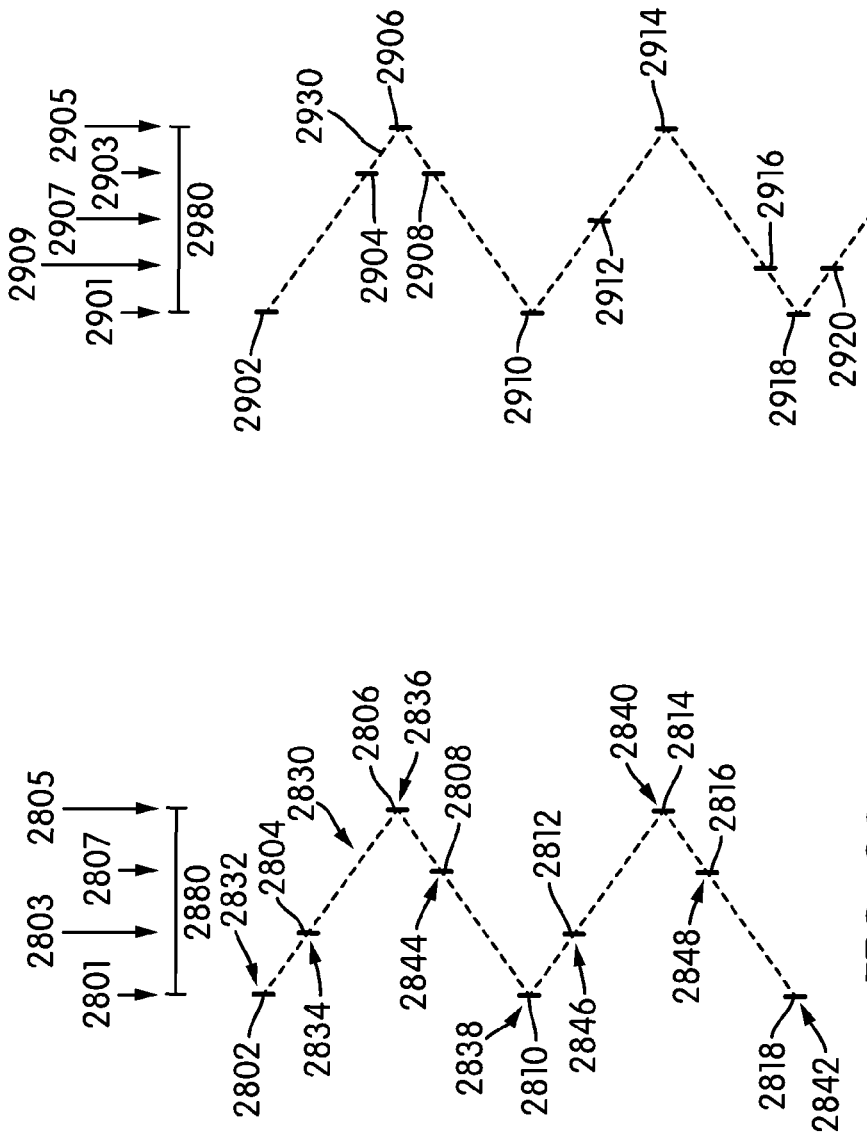
FIG. 29 is a schematic view showing another alternative embodiment of the chain ring in accordance with the disclosure.

Turning next to the pattern illustrated in FIG. 29, the pattern illustrated may be described as a regular, repeating pattern of twelve teeth using five lateral positions. A first tooth 2902 may be positioned at a first lateral position 2901 across a thickness 2980 of a chain ring. A second tooth 2904 may be positioned at a second lateral position 2903 across the thickness 2980 of the chain ring. A third tooth 2906 may be positioned at a third lateral position 2905 across the thickness 2980 of the chain ring. The second tooth 2904 may be circumferentially between and circumferentially adjacent each of the first tooth 2902 and the third tooth 2906. A fourth tooth 2908 may be positioned at the second lateral position 2903 across the thickness 2980 of the chain ring. A fifth tooth 2910 may be positioned at the first lateral position 2901. A sixth tooth 2912 may be positioned at a fourth lateral position 2907. The seventh tooth 2914 may be positioned at the third lateral position 2905. The eighth tooth 2916 may be positioned at a fifth lateral position 2909. A ninth tooth 2918 may be positioned at the first lateral position 2901. A tenth tooth 2920 may be positioned at the fifth lateral position 2909. An eleventh tooth 2922 may be positioned at the third lateral position 2905. Finally, a twelfth tooth 2924 may be positioned at the fourth lateral position 2907. As may be observed, the first lateral position 2901, the second lateral position 2903, the third lateral position 2905, the fourth lateral position 2907, and the fifth position 2909 may differ from one another. The second lateral position 2903 may be laterally between the first lateral position 2901 and the third lateral position 2905. Similarly, the fourth lateral position 2907 and the may be laterally between the first lateral position 2901 and the third lateral position 2905. The fifth lateral position 2909 may be laterally between the first lateral position 2901 and the third lateral position 2905.

The first tooth 2902, the fifth tooth 2910, and the ninth tooth 2918 may each be positioned at the first lateral position. Three teeth, namely, the second tooth 2904, the third tooth 2906, and the fourth tooth 2908 may be circumferentially between the first tooth 2902 and the fifth tooth 2910. Similarly, three teeth, namely, the sixth tooth 2912, the seventh tooth 2914, and the eighth tooth 2916 may be circumferentially between the fifth tooth 2910 and the ninth tooth 2918. As may be observed, of the three teeth disposed circumferentially between the two closest teeth in the first lateral position, each tooth may be in any of the second, third, fourth, and fifth lateral positions. The tooth in the third lateral position may be circumferentially between two teeth in two of the other lateral positions.

As may further be seen in FIG. 29, each end face can be seen as having a centerpoint. A substantially undulating pattern can be seen by drawing a line or curve between centerpoints of adjacent teeth. This pattern is drawn schematically in FIG. 29 by the dashed line 2930.

The embodiment of FIG. 29 may be most suitable in configurations where the chain ring has a number of teeth that is divisible by four, i.e., 32, 36, 40, or 44. The regular four-tooth patterns of FIG. 29 are unlikely to be used on a chain ring that includes a number of teeth not divisible by four. This is because the precise regularity of the pattern may be broken when the number of teeth is not divisible by four. However, additional teeth may be added in the second, fourth, or fifth lateral positions adjacent any other tooth in the second, fourth, or fifth lateral positions as may be desired.

A person having ordinary skill in the art will understand, by comparing the embodiment of FIG. 29 to the embodiments of FIGS. 11-15 that in the FIG. 29 configuration, the second lateral position 2903, the fourth lateral position 2907, and the fifth lateral position 2909 are substantially equivalent in placement to the second lateral position shown in the embodiments of FIGS. 11-15. The use of three spaced central positions in the embodiment shown in FIG. 29 is to modify the lateral forces placed on the chain as shown in FIG. 17.

In the embodiment shown in FIG. 17, the teeth are shown as being similar to that of FIG. 11. FIG. 31 shows how the embodiment of FIG. 29 would interact with the chain to perform a slightly modified function.

The chain 150 may include a first link 3102, which may be an outer link. The chain ring 700 may include a first tooth 3104, which may be positioned at a first lateral position 3101 across a thickness 3180 of the chain ring 700. The first tooth 3104 may be configured to engage the first link 3102 at its first lateral side 3106, thereby imparting a force to the chain 150 in a first lateral direction 3108. The chain 150 may include a second link 3110, which may be an inner link. The chain ring 700 may include a second tooth 3112, which may be positioned at a second lateral position 3103 across a thickness 3080 of the chain ring 700. The second tooth 3112 may be configured to fit within the second link 3110. The second tooth 3112 may be configured to engage the second link 3110 at its second lateral side 3111, thereby imparting a force to the chain 150 in the second lateral direction 3120. The chain 150 may include a third link 3114, which may be an outer link. The chain ring 700 may include a third tooth 3116, which may be positioned at a third lateral position 3105 across the thickness 3180 of the chain ring 700. The third tooth 3116 may be configured to engage the third link 3114 at its second lateral side 3118, thereby imparting a force to the chain 150 in a second lateral direction 3120. The chain ring 700 may include a fourth tooth 3124, which may be positioned at a second lateral position 3103 across the thickness 3180 of the chain ring 700. The fourth tooth 3124 may be configured to fit within a fourth link 3122, which may be an inner link. The fourth tooth 3124 may be configured to engage the fourth link 3122 at its second lateral side 3126, thereby imparting a force to the chain 150 in the second lateral direction 3120. The chain 150 may include a fifth link 3128, which may be an outer link. The chain ring 700 may include a fifth tooth 3130, which may be positioned at a first lateral position 3101 across the thickness 3180 of the chain ring 700. The fifth tooth 3130 may be configured to engage the fifth link 3128 at its first lateral side 3132, thereby imparting a force to the chain 150 in the first lateral direction 3108. The chain 150 may include a sixth link 3134, which may be an inner link. The chain ring 700 may include a sixth tooth 3133, which may be positioned at a fourth lateral position 3107 across the thickness 3180 of the chain ring 700. The sixth tooth 3133 may be configured to fit within the sixth link 3134 and impart substantially no lateral force to the sixth link 3134. The chain 150 may include a seventh link 3136, which may be an outer link. The chain ring 700 may include a seventh tooth 3138, which may be positioned at a third lateral position 3105 across the thickness 3180 of the chain ring 700. The seventh tooth 3138 may be configured to engage the seventh link 3136 at its second lateral side 3140, thereby imparting a force to the chain 150 in the second lateral direction 3120. The chain 150 may include an eighth link 3142. The chain ring 700 may include an eighth tooth 3144, which may be positioned at a fifth lateral position 3109 across the thickness 3180 of the chain ring 700. The eighth tooth 3144 may be configured to fit within the eighth link 3142, which may be an inner link. The eighth tooth 3144 may be configured to engage the eighth link 3142 at its first lateral side 3146, thereby imparting a force to the chain 150 in the first lateral direction 3108. The chain 150 may include a ninth link 3148, which may be an outer link. The chain ring 700 may include a ninth tooth 3150, which may be positioned at a first lateral position 3101 across the thickness 3180 of the chain ring 700. The ninth tooth 3150 may be configured to engage the ninth link 3148 at its first lateral side 3152, thereby imparting a force to the chain 150 in the first lateral direction 3108. The chain 150 may include a tenth link 3154, which may be an inner link. The chain ring 700 may include a tenth tooth 3156, which may be positioned at a fifth lateral position 3109 across a thickness 3080 of the chain ring 700. The tenth tooth 3156 may be configured to engage the tenth link 3154 at its first lateral side 3158, thereby imparting a force to the chain 150 in the first lateral direction 3108. The chain 150 may include an eleventh link 3160, which may be an outer link. The chain ring 700 may include an eleventh tooth 3162, which may be positioned at a third lateral position 3105 across the thickness 3180 of the chain ring 700. The eleventh tooth 3162 may be configured to engage the eleventh link 3160 at its second lateral side 3164, thereby imparting a force to the chain 150 in a second lateral direction 3120. The chain 150 may include a twelfth link 3166. The chain ring 700 may include a twelfth tooth 3168, which may be positioned at a fourth lateral position 3107 across a thickness 3180 of the chain ring 700. The twelfth tooth 3168 may be configured to fit within the twelfth link 3166, which may be an inner link. The twelfth tooth 3168 may be configured to fit within the twelfth link 3166 and impart substantially no lateral force to the twelfth link 3166.

In many embodiments with four lateral positions, it may be helpful to maintain appropriate proportions of teeth in each lateral position. Keeping the combined number of teeth in the first lateral position 3101 and the fifth lateral position 3109 approximately equal to the combined number of teeth in the second lateral position 3103 and the third lateral position 3105 will cause the lateral force in the first direction 3108 (the first lateral force) and the lateral force in the second direction 3120 (the second lateral force) to be approximately equal, which may be desirable in many embodiments. When either lateral force is applied to the chain 150, the chain 150 is permitted to flex in the direction of the respective lateral force. In many embodiments, the chain is permitted some lateral give or play due to its construction. The application of lateral force by the embodiments disclosed may provide additional security to the chain engagement.

With respect to the embodiment of FIG. 29, it will be apparent to a person having ordinary skill in the art that teeth in the second lateral position 2903, the teeth in the fourth lateral position 2907, and the teeth in the fifth lateral position 2909 combine to perform the function of the teeth in the second lateral position, as disclosed in other embodiments, e.g. second lateral position 1103 as described in connection with FIG. 11 above. While FIG. 29 describes a progression of the teeth in various lateral positions, the person having ordinary skill in the art may instead switch the position of any tooth among the second, fourth, and fifth lateral positions. Similarly, a person having ordinary skill in the art may modify the design of FIG. 29 to incorporate the teachings in any of the schematics of FIGS. 11-15 and the related description to incorporate the fourth and fifth lateral positions within those designs.

Further, in any of the illustrated embodiments, the end face of any tooth may be the same as or different from the end face of any other tooth in shape and size. A person having ordinary skill in the art will understand that the schematic views of the various embodiments are simplified to show an overall structure, not a detailed structure with teeth of a particular size and shape. Teeth having various sizes and shapes may be used in any of the embodiments within the size and shape restrictions of a typical chain 150. In some embodiments, however, the use of a tooth with an increased size may be useful.

One such alternative embodiment is shown in FIG. 32. FIG. 32 is a schematic, rather than detailed, view of a design that shows a tooth that spans multiple lateral positions. Such an embodiment may advantageously be used in the context of an embodiment like that illustrated and described in connection with FIG. 12. The embodiment of FIG. 32 may be used if, for example, a chain ring is used that has an even number of teeth that is not divisible by four, i.e., 34, 38, 42, or 46. In such a configuration, the addition of one tooth in the second lateral position and one tooth that spans multiple lateral positions may be desirable. Of course, a person having ordinary skill in the art may elect to add such a pattern of teeth in any position along the chain ring.

A first tooth 3202 may be positioned at a first lateral position 3201 across a thickness 3280 of a chain ring. A second tooth 3204 may be positioned at a second lateral position 3203 across the thickness 3280 of the chain ring. A third tooth 3206 may be positioned at a third lateral position 3205 across the thickness 3280 of the chain ring. The second tooth 3204 may be circumferentially between and circumferentially adjacent each of the first tooth 3202 and the third tooth 3206. A fourth tooth 3208 may be positioned at the second lateral position 3203 across the thickness 3280 of the chain ring. After the fourth tooth 3208, the four-tooth pattern may be seen as being broken. Instead, a fifth tooth 3210 that spans multiple lateral positions may be included.

The fifth tooth 3210 may, as shown in FIG. 32, span all three lateral positions 3201, 3203, 3205. In some embodiments, it may be desirable for the fifth tooth 3210 to make such a span to fill substantially an entire width of an outer link of a chain in which it is configured to intermesh. In other embodiments, it may be desirable for such a tooth to encompass only two lateral positions, whether spanning the first 3201 and second 3203 lateral positions or the second 3203 and third 3205 lateral positions. As noted in connection with earlier embodiments, where there may be more than three lateral positions, a span of a different subset of lateral positions may be made without undue experimentation. The use of such a tooth may be useful in some contexts. Such a tooth may be configured to create a lateral force on a link of the chain in at least one direction, as may be deemed desirable by a designer. After the inclusion of the fifth tooth 3210, a sixth tooth 3212 may be positioned at the second lateral position circumferentially adjacent the fifth tooth 3210. The remaining pattern and features shown in FIG. 32 will be understood to be substantially identical to the pattern and features shown in FIG. 12.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. A drivetrain for a vehicle, comprising:
  a chain having a centerline; and
  a chain ring comprising a plurality of teeth joined to one another and serially arranged;
    wherein each of the plurality of teeth is positioned laterally across a thickness of the chain ring;
    wherein the position of each of the plurality of teeth may be averaged to calculate an average tooth position laterally across the thickness;
    wherein the average tooth position of the plurality of teeth is offset from the chain centerline when in operative position; and
    wherein each of the plurality of teeth has a thickness and the thickness of each of the plurality of teeth at its respective thickest point is substantially identical.

2. The drivetrain according to claim 1, wherein about half of the plurality of teeth are positioned in one lateral position across the thickness of the chain ring.

3. The drivetrain according to claim 2, wherein at least the remainder of the plurality of teeth are offset from the centerline of the chain.

4. The drivetrain according to claim 2, wherein at least a portion of the remainder of the plurality of teeth are offset from the centerline of the chain in a single direction.

5. The drivetrain according to claim 1, wherein at least about half of the plurality of teeth are offset from the centerline of the chain.

6. The drivetrain according to claim 5, wherein each of the plurality of teeth is offset from the centerline of the chain.

7. A drive system for a vehicle, comprising:
a drive chain having a plurality of inner links and a plurality of outer links, each link comprising an inner plate and an opposite outer plate, each inner plate having a first inner surface facing the outer plate and each outer plate having a second inner surface facing the inner plate; and
a chain ring having a plurality of teeth joined to one another and serially arranged;
wherein each of the plurality of teeth is configured to interfit with a respective one of the plurality of links of the drive chain;
wherein each of the plurality of teeth has a thickness, the thickness of each of the plurality of teeth at its respective thickest point being substantially identical;
wherein the plurality of teeth comprises a first set of teeth and a second set of teeth;
wherein each of the plurality of teeth has a first outer surface and a first inner surface;
wherein each of the inner surface and the outer surface of each of the first set of teeth is permitted to contact a corresponding inner surface of one of the inner or outer plate of a respective chain link with which it interfits in operative position when the chain interfits without shifting between rings; and
wherein at least one portion of one of the first outer surface and the first inner surface of each of the second set of teeth remains spaced from only one of the first and second inner surfaces of the respective link with which each of the second set of teeth interfits in operative position when the chain interfits without shifting between rings.

8. The drive system for a vehicle according to claim 7, wherein the at least one portion of the second set of teeth is spaced from the outer plate.

9. The drive system for a vehicle according to claim 7, wherein the at least one portion of each of the second set of teeth is spaced from the inner plate.

10. The drive system for a vehicle according to claim 7, wherein each of the second set of teeth is configured to contact only one of the inner plate and the outer plate.

11. The drive system for a vehicle according to claim 10, wherein each of the second set of teeth is configured to contact the inner plate.

12. The drive system for a vehicle according to claim 10, wherein each of the second set of teeth is configured to contact the outer plate.

13. A drive system for a vehicle, comprising:
a drive chain having a plurality of inner links, a plurality of outer links, and a centerline;
wherein each link comprises a first plate and a second plate; and
a chain ring having a plurality of teeth joined to one another and serially arranged;
wherein each of the plurality of teeth has a thickness, the thickness of each of the plurality of teeth at its respective thickest point being substantially identical;
wherein the plurality of teeth comprises a first set of teeth and a second set of teeth;
wherein each tooth of the second set of teeth is configured to fit within one of the outer links of the drive chain in operative position;
wherein an average tooth position of the second set of teeth is offset from the chain centerline when in operative position;
wherein each tooth in the second set of teeth has a cross section taken on a plane extending laterally across the tooth;
wherein the cross section is substantially hat shaped, the cross section having a circumferentially longer portion and a circumferentially shorter portion.

14. The drive system for a vehicle according to claim 13, wherein the shorter portion of each of the second set of teeth is configured to face a first direction.

15. The drive system for a vehicle according to claim 14, wherein the shorter portion of each of the second set of teeth is configured to face the first plate of each of the outer links of the drive chain.

16. The drive system for a vehicle according to claim 13, wherein each tooth of the first set of teeth is configured to fit within one of the inner links of the drive chain in operative position.

17. The drive system for a vehicle according to claim 13, wherein each tooth in the first set of teeth has a hat shaped cross section having a longer portion and a shorter portion.

18. The drive system for a vehicle according to claim 17, wherein the shorter portion of each of the first set of teeth is configured to face a second direction.

19. The drive system for a vehicle according to claim 18, wherein the shorter portion of each of the first set of teeth is configured to face the second plate of each of the outer links of the drive chain.

* * * * *